United States Patent
Kashi et al.

(10) Patent No.: US 10,891,584 B2
(45) Date of Patent: Jan. 12, 2021

(54) DEVICES, SYSTEMS, AND METHODS FOR STORING ITEMS

(71) Applicant: Smiotex, Inc., San Jose, CA (US)

(72) Inventors: Manjunatha Kashi, Milpitas, CA (US); Jyothi Kashi, Milpitas, CA (US)

( * ) Notice: Subject to any disclaimer, the term of this patent is extended or adjusted under 35 U.S.C. 154(b) by 624 days.

(21) Appl. No.: 15/092,585

(22) Filed: Apr. 6, 2016

(65) Prior Publication Data
US 2016/0300187 A1  Oct. 13, 2016

Related U.S. Application Data

(60) Provisional application No. 62/146,187, filed on Apr. 10, 2015.

(51) Int. Cl.
*G06Q 10/08* (2012.01)

(52) U.S. Cl.
CPC ..... *G06Q 10/0836* (2013.01); *G06Q 10/0832* (2013.01)

(58) Field of Classification Search
CPC ..... G06Q 10/0836; A47G 29/00; G07F 11/00; G07F 17/00
See application file for complete search history.

(56) References Cited

U.S. PATENT DOCUMENTS

| | | | |
|---|---|---|---|
| 9,745,130 B1* | 8/2017 | Rawal | G06Q 10/0836 |
| 9,767,265 B2* | 9/2017 | Schropfer | H04L 63/08 |
| 2016/0027261 A1* | 1/2016 | Motoyama | G06Q 10/04 340/313 |
| 2016/0066732 A1* | 3/2016 | Sarvestani | A47G 29/1201 232/24 |
| 2016/0235236 A1* | 8/2016 | Byers | A47G 29/14 |

OTHER PUBLICATIONS

Nakanishi, A. Yuko J., and B. Jeffrey Western. "Advancing the state-of-the-art in transportation security identification and verification technologies: Biometric and multibiometric systems." 2007 IEEE Intelligent Transportation Systems Conference. IEEE, 2007. (Year: 2007).*

* cited by examiner

*Primary Examiner* — Scott M Tungate

(57) ABSTRACT

The subject matter described herein includes devices, systems, and methods for intelligently storing, sending, and receiving items such as packages for storage. The devices, systems and methods include providing a mechanism for storing, locking, unlocking, accessing, and monitoring the process of sending an item for delivery or receiving an item for delivery. The secure storage of items in the disclosed device facilitates remote maintenance and diagnostics, secure delivery and retrieval of items, the sharing of resources, and a reduction in consumer and delivery interaction.

20 Claims, 25 Drawing Sheets

DEVICES, SYSTEMS, AND METHODS FOR STORING ITEMS

PRIORITY CLAIM

This application claims priority to U.S. Provisional Patent Application No. 62/146,187 filed on Apr. 10, 2015, and entitled "SMART MAILBOX SYSTEM". The entirety of the aforementioned application is incorporated by reference herein.

TECHNICAL FIELD

This disclosure generally relates to devices, systems and methods for securely storing, receiving and delivering items.

BACKGROUND

Given the advent of the internet a greater number of consumers purchase goods via online retail and online shopping outfits. Many retail shops have diversified its presence online as well in addition to its physical store front location. As a consequence of an increase in online shopping, consumers are receiving goods via mail and delivery mechanisms. Today, a broad assortment of goods (e.g., electronics, food, medicines, etc.) are delivered directly to a consumers store-front, home, workplace, or other such desired locations. The delivery of goods is now a mainstream custom in society and as with many ubiquitous activities, the delivery of goods comes with its own set of issues.

One such problem with the delivery of goods to an establishment (e.g., home, business, office, etc.) is the security related to the package. A package delivered to a door step is vulnerable to theft or damage (e.g., via weather, wear and tear, etc.). Also, if a wrong package arrives or the package does not arrive at all, the consumer is left to resolve the matter with the delivery carrier and the seller, which can cause the consumer much time, inconvenience and frustration. Furthermore, the delivery process in general can be inefficient and time intensive. For instance, if a delivery person arrives at the point of delivery at a time when the purchaser is absent or unavailable, then the deliverer will either make another attempt or keep the package at the postal office for pick-up by the consumer.

In other instances, a consumer may be required to re-book the delivery of the package which causes its own set of inconvenience. For packages, delivered to consumers at work, there is the problem of the employer mailroom sorting through a glut of personal and business packages. As such, a large influx of incoming packages can inundate a mail delivery room of a company and cause new policies to be implemented or a re-tooling of operations related to accommodating incoming packages. Thus, new devices, systems, and methods are required to address such issues related to the delivery of goods.

SUMMARY

The following presents a simplified summary of the disclosure in order to provide a basic understanding of some aspects of the disclosure. This summary is not an extensive of the disclosure. It is intended to neither identify key or critical elements of the disclosure nor delineate any scope of the particular aspects of the disclosure, or any scope of the claims. Its sole purpose is to present some concepts of the specification in a simplified form as a prelude to the more detailed description that is presented in this disclosure.

In accordance with an aspect, disclosed is a device comprising a receptacle, a locking component, and an access component. In an aspect, the receptacle component comprises a set of storage compartments configured to receive a set of delivery items, wherein the set of storage compartments is accessible by a set of doors. In another aspect, a locking component is comprised of a locking mechanism configured to lock a first subset of doors of the set of doors. In yet another aspect, an access component is configured to unlock the first subset of doors of the set of doors based on a set of authorization credentials that facilitates temporary access or continual access to a first subset of storage components of the set of storage components corresponding to the first subset of doors, wherein a first grant of temporary access is based on a first subset of authorization credentials and a second grant of continual access is based on a second subset of authorization credentials.

In another embodiment, disclosed is a system comprising a monitoring component, a permission component, and a scheduling component. In an aspect, a monitoring component is configured to monitor a set of activities associated with an electronic storage device that stores a set of delivery items, wherein a first subset of activities of the set of activities comprise any of a delivering of a first subset of delivery items of the set of delivery items or accessing the first subset of delivery items of the set of delivery items, and wherein the electronic storage device comprises a set of storage compartments.

In another aspect, a permission component configured to temporarily unlock a first door corresponding to a first subset of storage compartments of the set of storage compartments by a first user device based on satisfaction of a first set of access criteria or continually unlock the first door by a second user device based on satisfaction of a second set of access criteria. In yet another aspect, a scheduling component is configured to manage a set of scheduling tasks of the electronic storage device, wherein a first subset of scheduling tasks of the set of scheduling tasks represent a coordination of a first subset of storage compartments of the set of storage compartments for receipt of the first subset of delivery items based on a set of storage criteria, wherein the coordination is in accordance with the first subset of activities.

In yet another embodiment, described is a method. In an aspect, the method comprises monitoring, by a system comprising a processor, an electronic storage device comprising a processor, a set of activities associated with an electronic storage device that stores a set of delivery items, wherein a first subset of activities of the set of activities comprise any of a delivering of a first subset of delivery items of the set of delivery items or accessing the first subset of delivery items of the set of delivery items, and wherein the electronic storage device comprises a set of storage compartments.

In yet another aspect, the method comprises temporarily unlocking, by the system, a first door corresponding to a first subset of storage compartments of the set of storage compartments by a first user device based on satisfaction of a first set of access criteria or continually unlock the first door by a second user device based on satisfaction of a second set of access criteria. Furthermore, in an aspect the method comprises managing, by the system, a set of scheduling tasks of the electronic storage device, wherein a first subset of scheduling tasks of the set of scheduling tasks represent a coordination of a first subset of storage compartments of the set of storage compartments for receipt of the first subset of delivery items based on a set of storage criteria, wherein the coordination is in accordance with the first subset of activities.

The following description and the annexed drawings set forth in detail certain illustrative aspects of this disclosure. These aspects are indicative, however, of but a few of the various ways in which the principles of this disclosure may be employed. This disclosure intended to include all such aspects and their equivalents. Other advantages and distinctive features of this disclosure will become apparent from the following detailed description of this disclosure when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
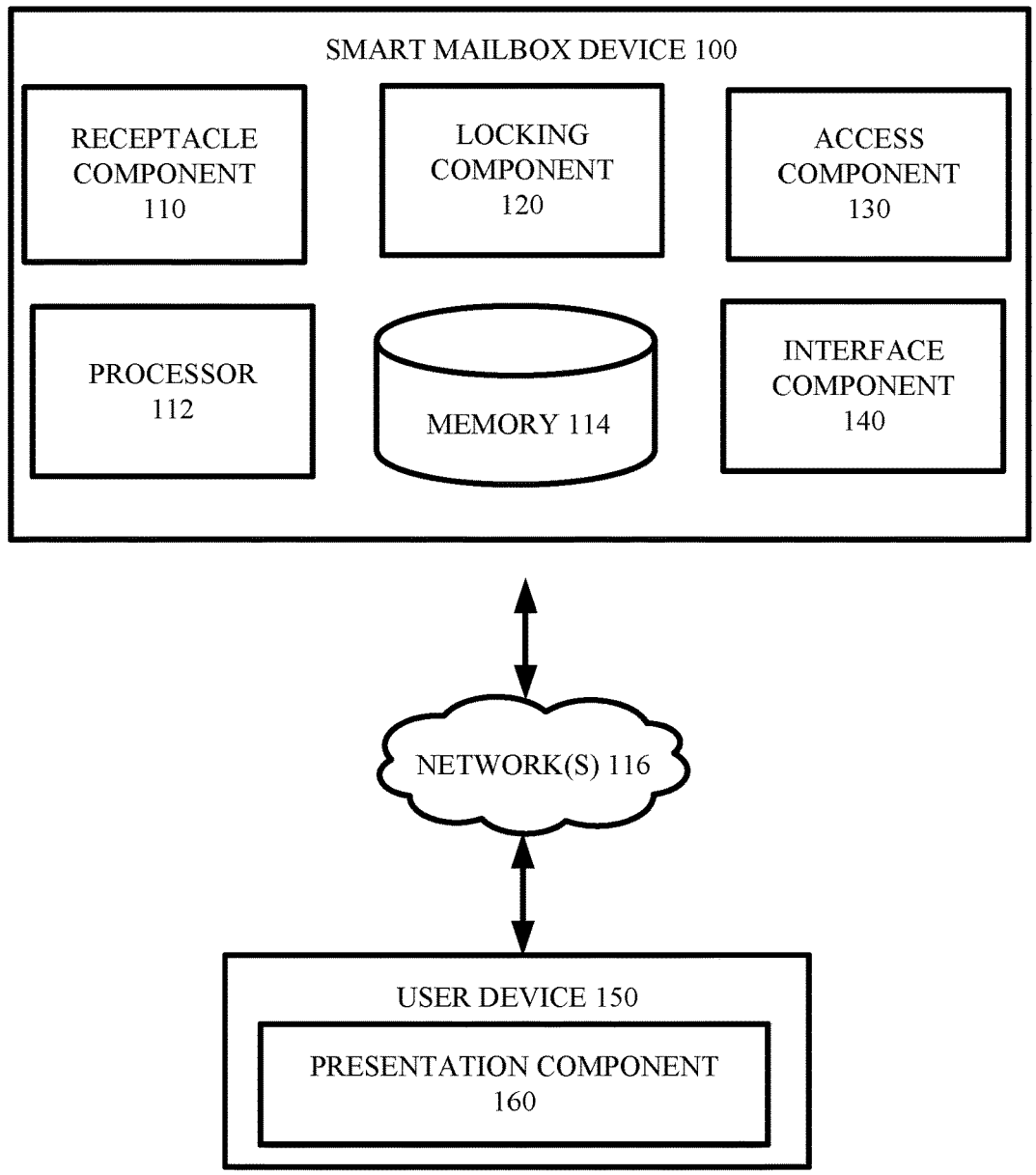
FIG. 1 illustrates a high-level block diagram of an example device 100 configured to securely keep items for storage, delivery and retrieval.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

Introduction

By way of a non-limiting introduction to the breadth of the present invention, the present invention includes several aspects, including:

1) smart mailbox device embodiments including hardware elements, software elements, and a physical structure that facilitates secure storage, delivery, and/or retrieval of items (e.g., packages, mail, articles, etc.);

2) system embodiments for executing instructions (e.g., by a processor where the instructions are stored in a memory) in connection with the smart mailbox device to facilitate the performance of operations associated with the storing, delivery, and/or retrieval of items; and 3) methods for securely storing, sending, and/or receiving items.

These aspects of the invention as well as others described herein, can be achieved by using methods, articles of manufacture and compositions of matter described herein. To gain full appreciation of the scope of the present invention, it will be further recognized that various aspects of the present invention can be combined to make desirable embodiments of the invention.

The subject disclosure is related to systems, methods, and devices for retrieving, sending, and storing items for delivery. The term item can refer to any 'thing' or 'good' that can be delivered or handled. For example, an item can be mail, food, packages, groceries, medicines, laundry, tobacco, alcohol, gas, or any other such item capable of being delivered using conventional and unconventional delivery infrastructure (e.g., postal services, couriers, family members, friends, business service personnel, drones, enterprise delivery service, etc.). In an aspect, a digital device (also referred to as a smart mailbox, an electronic storage device, device, etc.) is disclosed that employs a memory and a processor to facilitate the storage of items in a secure and convenient manner. The smart mailbox device can comprise a variety of embodiments that allow for the storage of multiple items for a variety of owners and allows for the temporary access by various users (e.g., delivery personnel) and continuous access to the compartments for other users (e.g., owners of the items, intended recipients of the items).

In another aspect, the subject disclosure describes a system configured to facilitate the storage of items within the smart mailbox device. In a non-limiting embodiment, the system can include a computer-readable storage media having stored thereon computer executable components, and a processor configured to execute computer executable components stored in the computer-readable storage media. These components can facilitate the secure storage of and access to items for delivery. Furthermore, in an aspect, the subject disclosure describes a method that includes using a processor to execute computer executable instructions stored in a memory to perform various acts to facilitate the secure storage of and access to items for delivery. In various additional embodiments, a computer readable storage device is provided that includes instructions that, in response to execution, cause a system including a processor to perform operations that facilitate the secure storage of and access to items for delivery.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures and devices are shown in block diagram form in order to facilitate describing the embodiments.

In implementations, the components described herein can perform actions, in real-time, near real-time, online and/or offline. Online/offline can refer to states identifying connectivity between one or more components. In general, "online" indicates a state of connectivity, while "offline" indicates a disconnected state. In an aspect, offline merging can prevent service interruptions, end-user quality degradation, and the like.

While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other. It is noted that while media items are referred to herein, the systems and methods of this disclosure can utilize other content items.

Example Embodiments of the Device, Systems, and Methods for Securely Storing Items Referring now to FIG. 1, presented is a non-limiting example smart mailbox device 100 configured to intelligently facilitate the secure storage, access, and transfer (e.g., sending and receiving) of items for delivery (e.g. packages) in accordance with various aspects and embodiments described herein. Device 100 and the descriptions in relation thereto provide exemplary embodiments of a smart mailbox device 100 integrated with hardware and/or software that can be used to implement the specific embodiments of the appended claims. The smart mailbox and its hardware and/or software is not meant to be limiting, and is presented to provide an enabling disclosure. FIG. 1, illustrates a box diagram of a device 100 according to one embodiment.

In this specific embodiment, the device 100 can be controlled by a control mechanism within smart mailbox device 100 and/or via a separate device (e.g., laptop, mobile device, tablet, desktop computer, personal digital assistance, etc.). As used herein, the types of control mechanisms can be referred to as "manipulating" the smart mailbox device 100. In other embodiments, manipulating the smart mailbox device 100 may also include pressing keys on a keypad, voice recognition commands, and/or providing any other type of input using an interface component 140 of the smart mailbox device or a third party device such as user device 150 (e.g., via a mobile device) that comprises a presentation component 160 (e.g., a screen or interface). The interface component 140 and/or user device 150 can be used to change or adjust settings of device 100 or control acts or tasks performed by device 100 (e.g., locking/unlocking device door) or capable of being performed by device 100.

Also, in an aspect, data can be transferred from smart mailbox device to a user device 150 using a network 116 or network resources. These network resources 116 can include an 'entity' that can be identified, named, addressed or handled, in any way whatsoever, in the web at large, or in any networked information system. For example, network resources 116 can include but are not limited to, a web page, a specific region/part of a web page, an application, a document included in an application, or a document at a digital application distribution store. For example, mailbox device 100 can include an entity configured to provide content or content items to a user at a client device 150 via a network (e.g., the Internet). For example, content provider 102 can include a website or application configured to present pictures, articles, blogs, videos, or other types of content items to client devices 150 via a network. According to this example, the content provided by the website or application can be configured for downloading, streaming or merely viewing at a client device 150 via the network.

In another aspect, device 100 can include an information store that provides access to data included in the information store via a network 116. As used herein, the term content item refers to any suitable data object that can be linked to and accessed or otherwise shared via a network 116 and includes but is not limited to: documents, articles, messages, website, web pages, programs, applications, user profiles, and media items. In an aspect, a content item includes a data object that can be identified by a URL and/or a URI. The term content item or media item can include but is not limited to streamable and dynamic media (e.g., video, live video, video advertisements, music, music videos, sound files, animations, and etc.) and static media (e.g., pictures, thumbnails). The term content item can also refer to a collection of content items such as a graphics, charts, textual information, and analytical representations of data.

In an aspect, device 100 can comprise a memory 114 that stores computer executable components and a processor 112 that executes computer executable components stored in the memory 114. For example, one or more of the components employed by content provider 102 (e.g., delivery item analysis component) can be stored in memory 114. In another aspect, device 100 can comprise a receptacle component 110 comprising a set of storage compartments configured to receive a set of delivery items, wherein the set of storage compartments is accessible by a set of doors. The set of storage compartments can comprise one or more storage compartments capable of storing delivery items. The storage compartments can be rectangular shaped, spherical shaped, or other such shape.

In an embodiment, device 100 can comprise a receptacle component 110 comprising a single free-standing storage compartment and the storage compartment can be integrated (e.g., linking together) with other single free-standing storage compartments to form a row, column, or numerous rows and/or columns of storage compartments. In an aspect, each free-standing single storage compartment can vary in size, shape, and dimensions (e.g., height, width, depth, etc.). In an embodiment, the single free-standing storage compartments are rectangular in shape with either a front door or a front door and back door.

In another embodiment, device 100 can comprise a receptacle component 110 comprising multiple storage compartments within device 100, where the compartments are organized in rows, columns, or both rows and columns. As such, the multiple storage compartments can vary is size, shape, and dimensions or comprise uniform sized and shaped storage compartments. Thus, a multiple storage compartment unit can be utilized by numerous independent owners such as in a multi-family establishment (e.g., apartment complex, condominium complex, etc.) or in a family setting where there are multiple owners within the same household (e.g., father, mother, son, daughter, etc.). The compartments can each be configured to receive and/or send a particular sized package.

In an aspect, receptacle component 110 can comprise storage compartments that serve various purposes. For instance, a broad variety of items (e.g., groceries, retail merchandise, laundry, apparel, food delivery items, controlled substances, tobacco, alcohol etc.) can be delivered to a user and stored in respective storage compartments. Thus the storage compartments can keep packages separated based on the item to be stored, the owner of the item, and the size of the item or package. Furthermore, the compartments can include various features that facilitate the proper storage of each respective item. Such compartment features can include a refrigeration capability (e.g., maintaining a colder temperature within the compartment), a heating capability (e.g., maintaining a higher temperature within the compartment), a dimensional adjustment capability (e.g., manual or automatic adjustment of roof, ceiling, or walls of each storage compartment to fit a respective package), an expansion capability (e.g., a portion of the compartment nested in the main receptacle portion of the compartment can be extended or retracted to enlarge or shrink the size of the compartment), a restricted access compartment (e.g., extra security precautions implemented in a compartment for storage of sensitive items such as controlled substances), and other such features.

In another aspect, device 100 further comprises an access component 130 configured to unlock a first subset of deliverer doors of the set of doors based on a first authorization mechanism that facilitates temporary access to a subset of storage components of the set of storage components. The device 100 not only provides a convenient mechanism for deliverers to drop off delivery items, but also for safely and securely storing owner items. In an aspect, access component 130 can facilitate the locking or unlocking (e.g., using a mechanical locking mechanism, an electrical locking mechanism, and/or an electromechanical locking mechanism) of one or more doors associated with device 100.

In an embodiment, device 100 can comprise one set of doors that open to each respective compartment where the doors are located on the front side of the compartments. Thus each compartment can have a door, three walls, a ceiling, and a floor. In another embodiment, device 100 can comprise two sets of doors that open to each respective compartment, where a first door is a front door and a second door is a back door to each compartment. Thus, in such embodiment, each compartment can have a first door, a second door located opposite the first door, two walls, a ceiling, and a floor. In an aspect, device 100 with two sets of doors can provide separate access to one or more users (e.g., owner-users inside a dwelling) and another group of one or more users (e.g., delivery personnel-users located outside a dwelling).

For instance, a front door can be accessible to users requiring temporary access to the compartment such as delivery personnel delivering a package or item. The front door can be accessible by owners and other continuous users as well. The second door can be intended for use by owners of each package within a respective compartment. Thus, in an embodiment, device 100 can be built into the wall of a user's home where the front doors of device 100 leading to respective compartments can be accessible to users (e.g., shipping personnel from outside the user's home who require only temporary access to deliver or pick up an item) and the back doors of device 100 leading to respective compartments can be accessible to users within the house (e.g., owners awaiting the receipt or send off of various packages in a respective compartment).

In yet another embodiment, device 100 can comprise four doors, one on each side of a compartment in order to access the compartment from any such side. For instance, within a house, the compartment can be accessible by three separate rooms and the outside or from four separate rooms. In yet another embodiment, the set of doors can be on opposite sides from one another (e.g., front door and back door on opposite ends of a compartment). In another embodiment, two doors can be located on adjacent walls rather than opposite on another as well.

In another aspect, each compartment can be accessed by a different user. For example, a mother can access a compartment storing her delivery item and a son can access a compartment storing his respective delivery item. As such, device 100 can employ a locking component 120 comprising a locking mechanism configured to lock a first subset of doors of the set of doors. In an aspect, the locking mechanism can include traditional locks such as; basic locks (lock and key mechanism), resistant lock (e.g., pad lock), high security locks, un-pickable locks; electronic locks which operate by means of electric current (e.g., using magnets, solenoids bolts, cylinders, and/or motors) such as, electromagnetic locks, electronic strikes, or electronic deadbolts and latches; digital locks; or other such locking mechanisms.

In an aspect, locking component 120 can comprise a locking mechanism (e.g., fastening device released by a physical object, smart lock, etc.) in connection with an integrated system components (e.g., including a memory that stores instructions and a processor that executes instructions within device 100) that facilitates the operation of locking and unlocking activities. For instance, in an embodiment, device 100 can employ a locking component 120 that comprises a smart lock mechanism that receives instructions to lock or unlock the compartment door from an authorized device (e.g., a mobile device, a laptop, a tablet, a smart TV, a personal computer, etc.). As such, the locking mechanism can utilize a physical object such as a key, a keycard, a fingerprint, an RFID card, a security token, or other means to facilitate unlocking the lock or by inputting information such as a key code, smart code, or password into the access system of device 100 (e.g., using access component 130) by means of direct input (e.g., keypad) or indirect input (e.g., using a mobile device, laptop, PDA, etc.) to supply the secret information (valid code) required to unlock the locking mechanism.

In yet another aspect, locking component 120 can employ a biometric door lock mechanism capable of identifying a unique characteristic of a person authorized to access the compartment. For instance, the biometric lock can use an optical (e.g., retina, iris scan technology) or thermal scanner to read and store a fingerprint of an authorized user or similarly a retina scanner can be used to read and store information associated with the retina of the authorized user. Thus, the authorized user can provide a fingerprint or retina to be scanned to access the compartment. Furthermore, in an aspect locking component 120 can employ other biometric-based locking mechanisms such as those based on facial recognition and/or voice recognition.

In another embodiment, device 100 can employ access component 130 configured to unlock the first subset of doors of the set of doors based on a set of authorization credentials that facilitates temporary access or continual access to a first subset of storage components of the set of storage components corresponding to the first subset of doors, wherein a first grant of temporary access is based on a first subset of authorization credentials and a second grant of continual access is based on a second subset of authorization credentials. As such, access component 130 can be programmed to allow temporary access (e.g., in the case of a smart locking mechanism) or continual access to respective compartments for deliverers, owners, and other such users based on an owner's permission to provide limited or unlimited accessibility to the compartment. Furthermore, in an embodiment, temporary or continual access can be granted with a physical door lock and key mechanism. For instance, in an aspect, a delivery-side door can be automated to allow access via a soft code and a retrieval-side or owners side door can be locked with a mechanical latch and/or mechanical locking mechanism.

In another aspect, access component 130 is capable of granting access to particular compartments based on a user's credentials. Thus a delivery person can be granted temporary access to a compartment in order to deliver or pick-up an item within a compartment. Thus, a software system element integrated within device 100 can facilitate a temporary grant of access by an authorized delivery person by temporarily unlocking a locking mechanism associated with the front door of the compartment. Accordingly, a delivery person can be granted temporary access to a compartment to deliver an item, where the door to a compartment (e.g., front door in a two door embodiment of device 100) can be temporarily unlocked based on the delivery personnel's authority. Furthermore, an owner of the delivery item can be granted access to a particular compartment (or more than one compartment) on a continual basis based on the owner-user authorization. Thus an owner-mother of a family can be granted access (e.g., to a front door or back door) to a compartment storing her delivery item and a son within the family can be granted access (e.g., using access component 130) to another compartment storing his delivery item. Furthermore, access to any compartment can be granted to multiple owners as well.

As such, a first owner of a first package may not be granted permission to access a second package in a second compartment unless the owner of such second package grants permission to the first owner to access the compartment storing the second package. Therefore, the compartments can be accessed through a variety of methods that allow the owner of packages consistent access and allow delivery personnel temporary access to compartments. In an embodiment, delivery personnel can access a respective compartment via soft access codes (e.g., a series of letters, numbers, and/or characters) that are only valid for specific compartments during a specific time period. Other constraints or liberties associated with access can be implemented as well. In another aspect, Bluetooth (or other wireless) technology can be implemented to facilitate unlocking of the door lock when a user utilizing an authorized device is within a close proximity of device 100. For instance, lock and unlock commands can be sent from a mobile device through a router to the door lock. Furthermore, a touch-based capability where a user device touches the door lock can also be implemented to facilitate unlocking of the device 100 door lock.

In an aspect, an authorization credential (e.g., PIN number, code, digital identifier, serial number of a mobile device, etc.) can be associated with a storage compartment. An authorized user can have temporary or continued access to a storage compartment based on providing a unique authorization credential. As such, locking component 120 in connection with access component 130 can lock any one or more doors of particular storage compartments and unlock one or more doors based on receipt of an authorization credential associated with such storage compartment. Each compartment may have several unique authorization credentials associated with various different users authorized to access respective compartment. Also, a time limitation may be associated with the authorization credential such that a particular authorization credential only allows access to a compartment during respective hours of the day.

In a non-limiting embodiment, device 100 can employ an interface component 140 of a presentation component 160 (e.g., using a user device 150) configured to present a set of information corresponding to the set of storage compartments and a set of contents located within the storage compartments. In an aspect, interface component 140 and/or presentation component 150 can display a graphical user interface via a display screen located on the device and/or via a display screen of another device (e.g., mobile device, laptop, PDA, tablet, desktop computer, etc.). For instance, various data associated with a package (e.g., weight, size, shape, delivery time, etc.) can be displayed on a display screen located on a mobile device and/or device 100. As such a display screen of presentation component can be any of many such displays such as a liquid crystal display, an electro luminescent display, a light emitting diode-based display, a plasma display, an organic light-emitting diode displays (OLED), an active-matrix OLED display (AMO-LED), an E-ink display, a super-AMOLED display, a retina display, capacitative touch screen LCD, resistive touch screen LCD, or other such display technologies.

Figure 2:
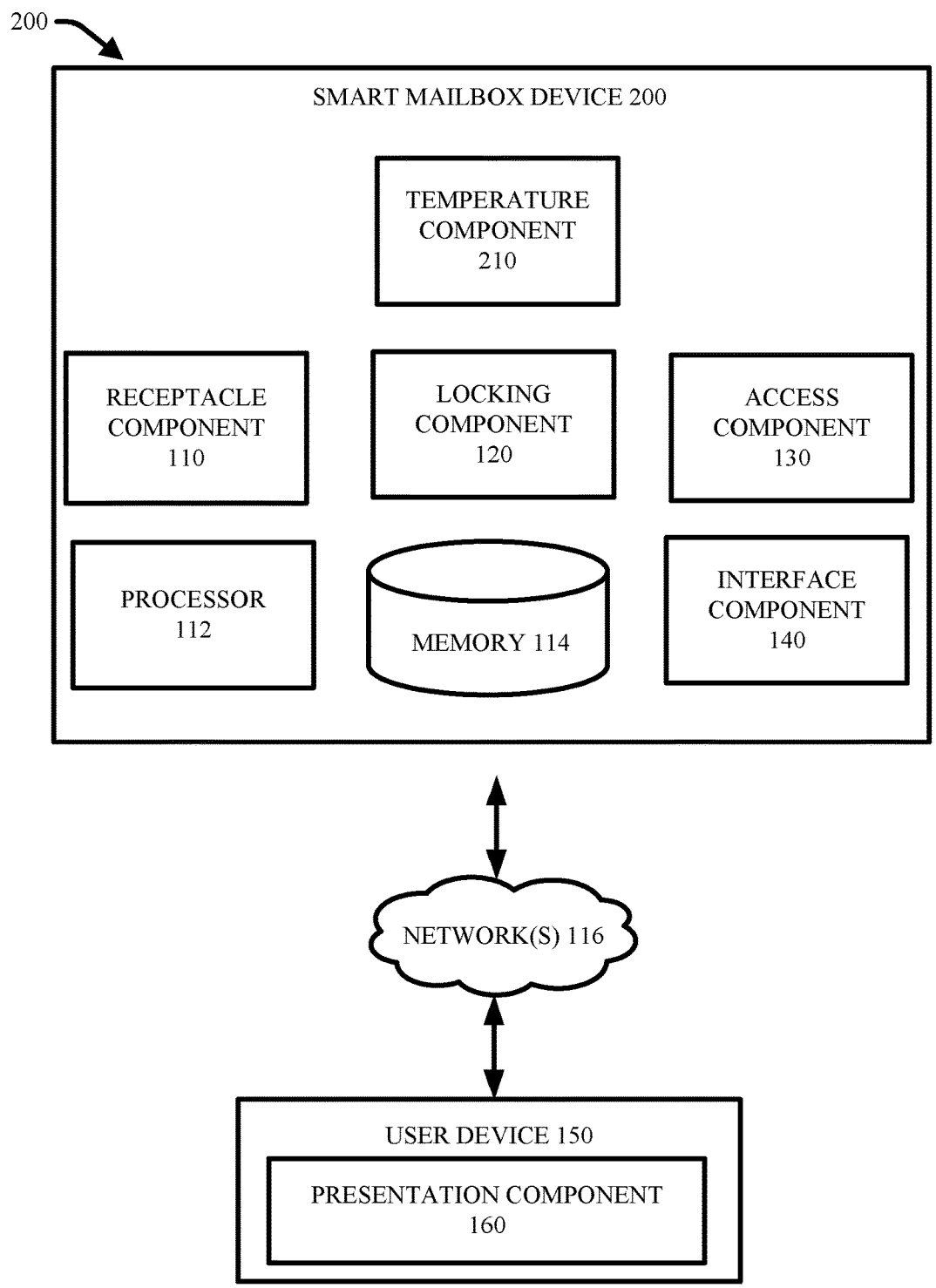
FIG. 2 illustrates a high-level block diagram of an example device 200 configured to securely keep items for storage, delivery and retrieval.

Referring now to FIG. 2, illustrated is a non-limiting example of device 200 in accordance with various aspects and embodiments described herein. Device 200 includes receptacle component 110, locking component 120, and access component 130. In another aspect, device 200 can further comprise temperature component 210 that regulates a temperature within a first compartment of the set of storage compartments. In an aspect, device 100 can comprise one or more storage compartments configured to regulate a temperature and/or a humidity level within the main housing of the storage compartment. Thus, the compartment can store particular items requiring conditions such as warm, hot, cold, cool, moist, dry, and other such environmental conditions.

In an embodiment, the compartment can contain insulation to retain heat and in another embodiment the compartment can comprise venting to allow for the circulation of air flow. The storage compartment of smart mailbox device 200 can employ conventional refrigeration technologies such as the use of refrigerant (e.g., vapor compression of a gas refrigerant), insulation (e.g., having insulated walls), and/or using various materials (e.g., clay walls) to facilitate cooling of the storage compartment or utilize alternative refrigeration technologies such as distributed systems, secondary loop systems, cascade systems, carbon dioxide systems, magnetocaloric refrigeration, heat pumping, and other such heat transfer and/or refrigeration technologies.

In another aspect, temperature component 210 can employ heating systems and devices (e.g., refractory walls) to regulate the warmth within a compartment. By regulating a temperature (e.g., using temperature component 210), device 200 can facilitate the storage, receipt, and delivery of perishable items (e.g., flowers, seafood, dairy, plants, meat, fruits, vegetables, live tropical fish), items classified under the perishable cargo regulations, or other such temperature (e.g., cooler temperature items) sensitive items. In another aspect, by maintaining a warmer temperature with a compartment, a heating compartment can maintain the warmth of various foods (e.g., restaurant delivery foods, pizza, etc.) and keep them ready to eat when an owner arrives to retrieve the item. Furthermore, in an aspect, temperature component 210 can be controlled by a thermostat mechanism (within device 200) allowing for the temperature management within the compartment. For instance, the temperature within the storage compartment can be set according to a schedule (e.g., vacation features, weekly scheduling, auto-scheduling, etc.), communicated via instant feedback to a user device (e.g., mobile device, tablet), monitored (e.g., time indication until target temperature is reached).

Furthermore, temperature component 210 can employ geo-fencing technology to determine whether a user is near to device 200 or far from device 200. As such, a target temperature setting can be achieved based on the proximity of a user from device 200. For instance, if a user (e.g., delivery person) is at a grocery store twenty miles from device 200, device 200 can use geo-fencing technology to identify when to begin cooling the storage compartment based on the estimated arrival time of the user with the items to be stored within the compartment. In another aspect, if a pizza delivery man is delivering a hot pizza, storage compartment can be warmed (e.g., using temperature component 210) ahead of time (e.g., using geo-fencing technology) to store the pizza item. In an embodiment, temperature component 210 can be integrated with temperature restrictions in order to prevent temperatures within the compartment from going too high or too low. Thus, a temperature may not be able to go beyond a certain value or limit in some embodiments.

In yet another aspect, temperature component 210 can employ equipment status sensors, weather condition sensors (e.g., identify precipitation levels, high and low temperatures, wind speed, etc. associated with the surrounding conditions around device 200), humidity sensors (e.g., monitor humidity within the storage compartment), motion sensors (e.g., detect movement around device 200), heat sensors (e.g., monitor changes in temperature within a compartment), light sensors (e.g., detect activity around device 200), pressure sensors (e.g., measuring barometric pressure) and other such sensor technologies. In an aspect, the temperature within the compartment can be regulated to be higher or lower than a comparative temperature outside of the device in a surrounding environment (e.g., inside a dwelling or home, outside within nature, within an office space, etc.).

Figure 3:
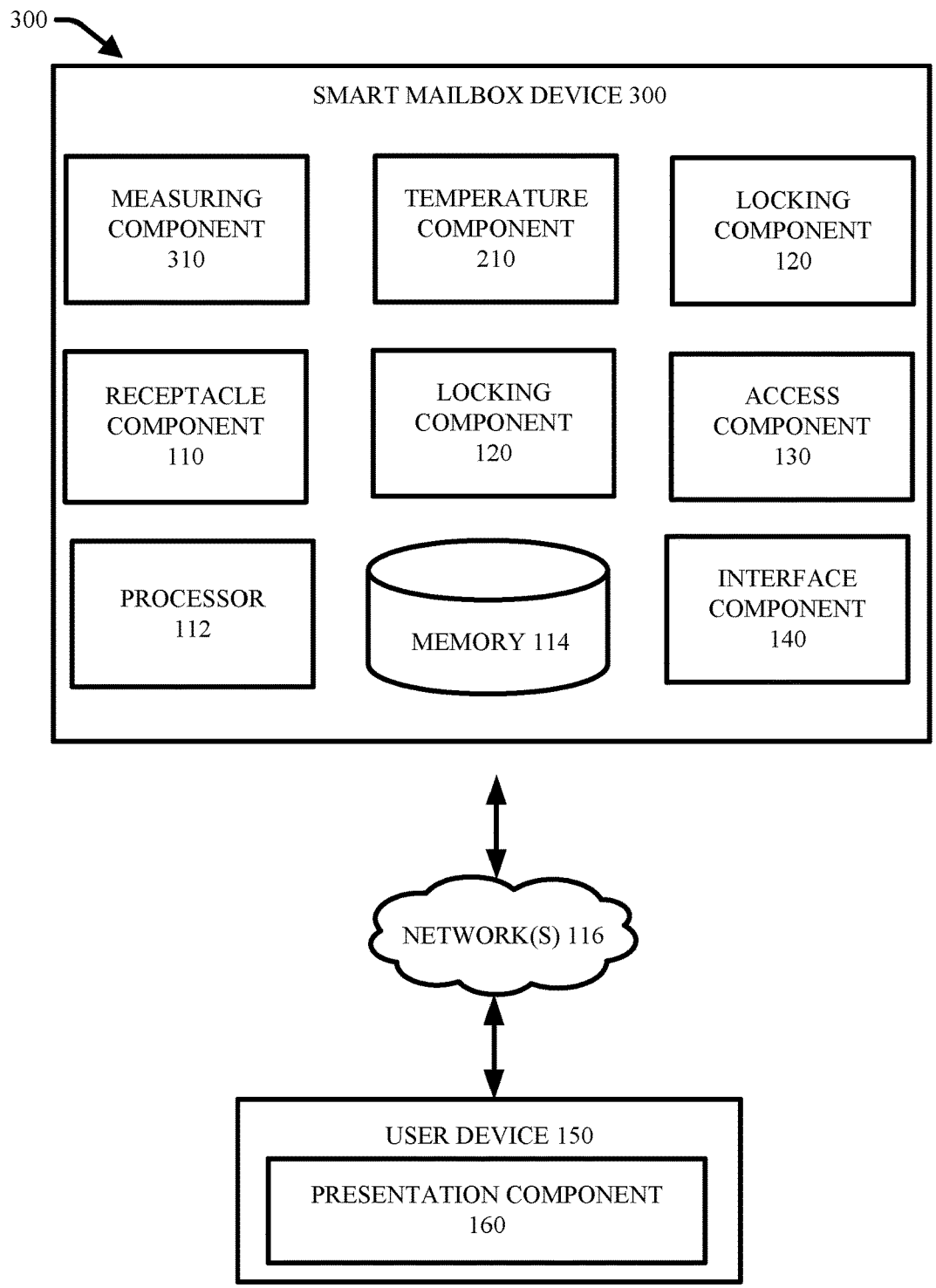
FIG. 3 illustrates a high-level block diagram of an example device 300 configured to securely keep items for storage, delivery and retrieval.

Turning now to FIG. 3 illustrated is a non-limiting example of device 300 in accordance with various aspects and embodiments described herein. Device 300 includes receptacle component 110, locking component 120, and access component 130. Furthermore, in an aspect, device 300 can further comprise a measuring component 310 that facilitates an adjustment of a set of compartment dimensions associated with a first compartment of the set of compartments, wherein a compartment dimension of the set of compartment dimensions comprises a compartment floor, a compartment wall, or a compartment ceiling, wherein the adjustment is capable of being based on a measurement of a first subset of delivery items of the set of delivery items within the first compartment using a graduated scale in connection with the compartment floor, the compartment walls, or the compartment ceiling, and wherein the adjustment is capable of being based on a detection of the measurement of the first subset of delivery items based on a detected measurement using optical sensors located on compartment floor, the compartment ceiling, and/or the compartment walls.

In an aspect, measuring component 310 facilitates the fitting of a package within device 300, therefore the compartment size should be larger than the package stored within the compartment housing. Accordingly, one or more storage compartments may be fitted with nested walls, roofs, and/or floors such that the compartment can be extended to house a larger package. The nested portion of the compartment can be pulled-out (e.g., manually) or automatically expanded from the main compartment. When the nested portion of the storage compartment is not expanded, the walls, ceiling, and floor of the compartment are doubled (telescopic). The wall framing the door is the only side that is not doubled.

For instance, if a compartment is not deep enough to fit a particular package, the walls, ceiling, and floor nested within the compartment can be slid or pulled out of the compartment such that it is no longer nested within the compartment. Thus, the compartment will increase in size and depth to allow for the storage of large packages. Furthermore, the inside walls, ceiling, and floor of the compartment can contain graduated markings inscribed on the surface of each respective compartment siding to identify linear measurements that facilitate accurate enlargement of the storage compartment to fit a particular package. In an aspect, the nested compartment walls, ceiling, and floor can be manually or automatically extended.

In another aspect, within the compartment, measuring component 310 has the capability of measuring the size of a package within the compartment by employing light sensors in connection with paired lights on opposite side of the inside of the storage compartment. In the absence of a package, the light sensors located opposite from one another will receive light from one another, however, in the presence of a package, the light sensors are obstructed and such obstruction of light facilitates a determination of the package dimensions. For instance, an optical sensor (e.g., photoelectric sensor) can emit light (e.g., red, laser, etc.) and upon the receipt of a package within a storage compartment, the light beam is broken or obstructed by the presence of the package.

Thus the measurement of package dimensions can be determined based on the obstructed light beam (e.g., measurement of the light beam). In another embodiment, optical sensors can emit a beam of light which is then reflected back to the sensor to activate the sensor output. In an aspect, the output can indicate the distance, size, shape, and other such target attributes of the package within the storage compartment (using light sensor technology). In another aspect, the positions of the light sensors can be arranged in such a way to account for particular dimensional details of packages (e.g., diagonal length).

Figure 4:
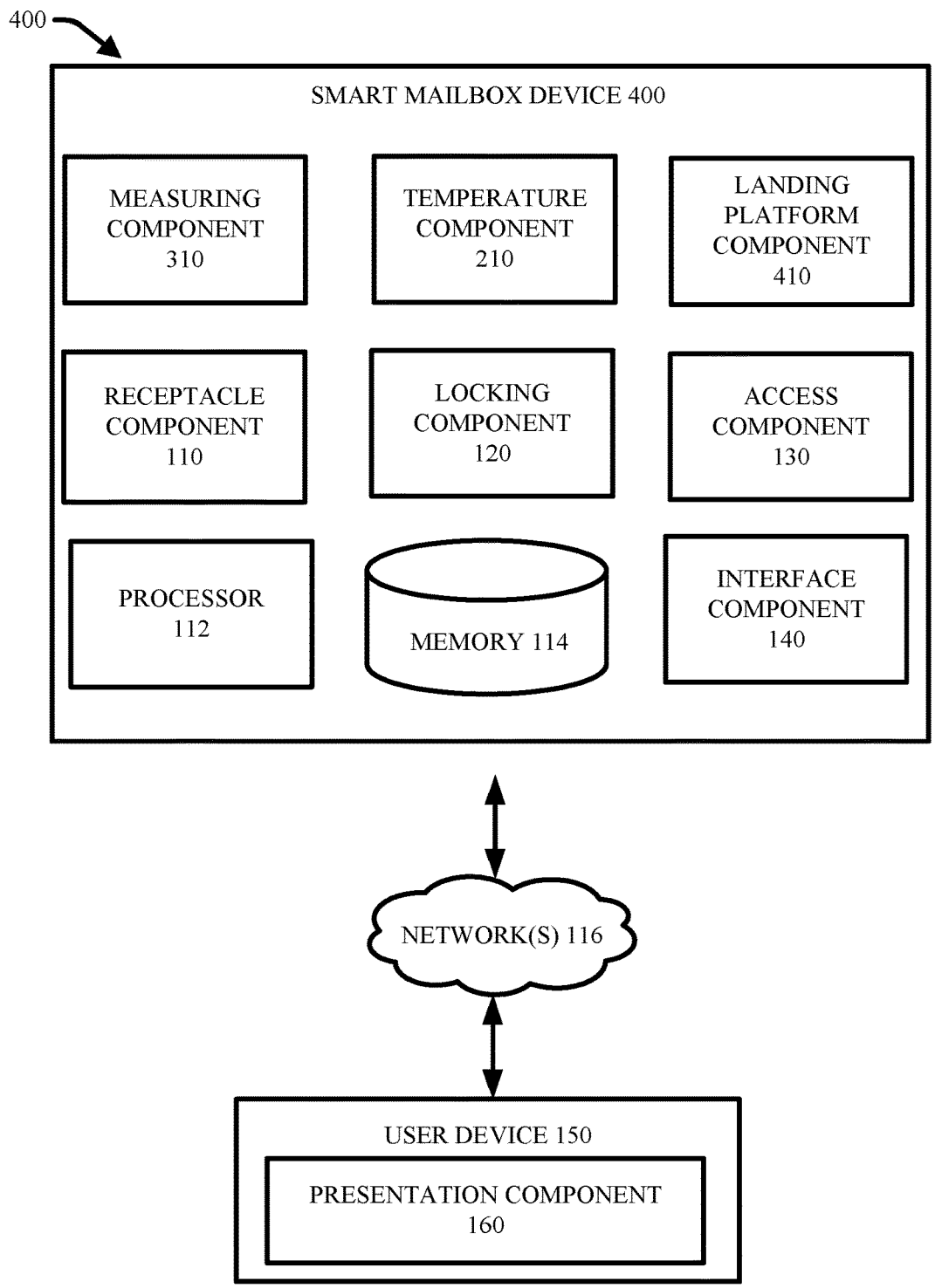
FIG. 4 illustrates a high-level block diagram of an example device 400 configured to securely keep items for storage, delivery and retrieval.

Turning now to FIG. 4 illustrated is a non-limiting example of device 400 in accordance with various aspects and embodiments described herein. Device 400 includes receptacle component 110, locking component 120, and access component 130. Furthermore, in an aspect, device 400 employs a landing platform 410 comprising a first roof and a second roof of a drone drop compartment of the set of compartments, wherein the landing platform is configured to facilitate a landing of a drone (e.g., a drone, an unmanned aerial vehicle, an unmanned aerial system, a flying load bearing helicopter, a flying vehicle, etc.), wherein the first roof is a retractable roof located above the second roof, wherein the first roof retracts to facilitate the drone landing on a perimeter of the second roof based on a drone drop compartment authentication of a signal emitted by the drone, and wherein the second roof comprises a retractable ceiling door capable of retracting to facilitate receipt of a subset of delivery items of the set of delivery items dropped by the drone into an opening within the second roof of the drone drop compartment and capable of closing the retractable ceiling door to securely store the subset of delivery items within the drone drop compartment.

In an aspect, device 400 facilitates the receipt of packages carried by a drone in that the device can comprise a chimney-like structure (or other structure extending from the top of device 400) extending vertically from smart mailbox 400. In an aspect, a door on top of the structure opens and a package can be dropped into the smart mailbox. The door can then close to secure the package within the storage compartment. In an embodiment, drone drop component can include a compartment with a door located on the compartment ceiling. The door can open and close to receive and securely store a package. The perimeter of the ceiling can include a raised wall and rim that allows for the landing of a drone. Thus the drone while holding the package can land on the rim and hold a sturdy position such that the drone can disengage from the package allowing the package to fall into drone landing compartment 410 through the ceiling door. In an aspect, the rim can be configured to be of a raised height to allow the package to have clearance room between the ceiling door and the bottom of the package. In another aspect, the rim can be configured to allow the package to rest on the ceiling door of drone drop compartment while the drone is securely perched on the rim.

In another embodiment, a retractable landing pad can extend from an opening (e.g., opening within a side wall of a compartment, etc.) of drone drop compartment such that a drone holding a package can land on the landing pad. The drone can then release the package and the landing pad can retract into drone drop compartment. Accordingly, the compartment door can close and secure the package upon the retraction of the landing pad and package within the compartment. In yet another aspect, device 400 can employ a global positioning software (GPS) chip capable of communicating the coordinates of device 400 to system software employed by the device. The GPS chip in connection with system software of device 400 can facilitate the communication of coordinates corresponding to drone drop compartment and the landing platform component 410 and/or rim to a drone. The location coordinates can assist the drone in identifying the landing location and successfully landing on the landing platform component 410 and/or rim of drone drop compartment.

In yet another embodiment, drone drop compartment and/or landing platform component 410 comprises a set of detection sensors configured to detect a presence or an absence of the drone, wherein the retractable ceiling door opens or closes based on a detected presence or a detected absence of the drone respectively by a set of detection sensors and receipt of an authorized identification token associated with the drone by the set of detection sensors, and wherein the set of detection sensors are capable of using digital, analog, optical and/or wireless techniques (e.g., using a laser beam or beam of light) to detect the authorized identification token.

Thus, device 400 can employ proximity sensors to detect objects, including drones, within a specified proximity of device 400 including drones. In an aspect, the proximity sensors can make use of electromagnetic fields or electromagnetic radiation technology to sense object near device 400. Furthermore, upon identifying an object, device 400 can attempt to send a prompt to the object in order to determine the object identity. For instance, a drone can respond to a received prompt (e.g., sent from device 400) by sending a digital identification token, which device 400 receives and can use to confirm detection of a drone authorized to deliver a package to landing compartment 410 of device 400. Furthermore, the drone can identify a particular compartment (e.g., if device 400 has numerous landing compartments or numerous compartments with a retractable landing pad) for delivery of the package based on coordinates provided by the GPS chip of device 400. Also, the drone's digital identification token can identify the particular compartment (e.g., in a multiple compartment embodiment of device 400) it is authorized to access for delivery of the package. Thus authorization can be granted to particular drones (e.g., based on ID tokens) with respect to particular compartments.

In various other embodiments, any of the disclosed devices (or any of device 100, device 200, device 300, or device 400) can comprise additional features to facilitate storage of various items. In an aspect, a compartment can comprise a refrigeration compartment and/or a heating compartment to keep stored items cold or hot respectively. This temperature controlled compartments can integrate refrigeration technologies and heating technologies such that the respective compartments are customized to effectively keep cool, warm and maintain items at an optimal temperature based on the item within the compartment.

In another aspect, one or more compartments can implement a weighing mechanism to weigh contents within a compartment. For instance, the weight of a package within a particular compartment can be determined by device 100 by utilizing a weighing scale or weighing platform integrated into a respective compartment. The scale can be calibrated and contain an overload protector. Furthermore, the scale can include the ability to tare packages, automate the measuring of a package, convert various units (e.g., grams to pounds and ounces), and connect with a display (E.g., device display or user device display such as a tablet or mobile phone) to present the weight data.

In yet another embodiment, any of the devices can generate a stamp or other postage indicia indicating the payment of a price associated with delivery or shipment of a package stored in a compartment. The device can employ technology to generate electronic stamps, definitive stamps, forever stamps, commemorative stamps, semi-postal stamps, print postage indicia (e.g., using a postage meter integrated within the device), mailing permit imprints, customized postage indicia, certified mail payments, or other such postage indicia. Furthermore, in an aspect, the weighing component in association with the postage generation component of the device can weigh a package and generate a postage payment indicia based on the weight of the package. Thus a compartment of the device can accurately and precisely apply a postage payment to a package and ready such package for pick-up and sending to an intended recipient using the device.

In another embodiment, the device can include a compartment dedicated for storage of controlled substances. As such, the compartment can possess extra security such as a requirement to input a restricted access code for particular users (e.g., a code for delivery personnel, package owner, etc.). In an aspect, the restricted access code can only be valid after a particular user accesses the storage compartment. For instance, after the delivery person drops the controlled substance into the secure compartment, an owner access code is enabled and rendered valid to allow an owner to open access the controlled substance using the valid access code.

In an aspect, the restricted access code allowing a user access to the controlled substance compartment can include a driver's license number, a social security number, other personal identifying information, or other conventionally used information items for user verification. In another aspect, the access code can employ a matching element that matches a photo of the user requesting access to the controlled substance compartment, where the photo is matched to an identifying image (e.g., stored at a database) and based on a match, the user is permitted to access the compartment, however if no such match is identified then the user is denied access to the compartment.

In yet another aspect, the restricted access code can incorporate a locking mechanism, such that, upon repeated entry of incorrect access codes, the compartment permanently locks. The smart mailbox device can send a notification to the delivery service (e.g., delivery company transmitting the package) and/or the user requesting various authorization confirmations to allow access to the compartment. Also, in an aspect, the controlled substance compartment in connection with the refrigeration capability and/or heating capability of the device can keep the controlled substance within storage conditions (e.g., cool, dry, etc.) recommended by the substance manufacturers (e.g. label storing instructions).

In another embodiment, the disclosed smart mailbox devices can comprise an emergency compartment dedicated to storing emergency supplies in the event of an emergency. Furthermore, in an aspect, the emergency compartment can comprise backup energy storage (e.g., generator, gas, home battery pack, etc.). Also, the emergency compartment can be paired to services related to the storage of emergency items in the emergency compartment such services including on-demand, period, and/or intelligent services. An on-demand service can include correlating an indicator with consumption of the emergency supplies such that the supplies are replenished based on the device. Periodic services can include periodic checks (e.g., every 3 months, annually, etc.) of emergency compartment content to ensure all supplies are usable, in working order and not expired. Another service can include a smart system within the device to track when emergency supplies expire and either have a service replenish such items (e.g., first aid kit, water bottles, canned goods, medicines, flashlight, batteries in devices, flares, etc.) or receive a notification within a reasonable time before expiration in order for the owner to replenish the almost expired emergency items themselves. In an aspect, a first aid kit can be stored in the emergency compartment or in another compartment within the device.

In any of the above listed embodiments, a single compartment of the device may have or perform any of the uses or functions listed above. Additionally, the functions may be automatically triggered and adjusted based on information collected by the smart mailbox device that indicates that the function or service is required. Furthermore, any of the smart mailbox device embodiments or any one or more compartment may include solar power operations. As such, the device can be overlaid with integrated solar panels in order to provide an energy efficient solar source of energy to power the device in addition or in lieu of traditional power sources.

Furthermore, in an embodiment, the device can comprise a light on the outside-facing side of the device (e.g., in an embodiment where one side of the device is accessible from inside a dwelling and an outer facing side of the device is accessible from outside a dwelling) or top rim of the device. Furthermore, in an aspect, the light can flicker to assist users in identifying a location of the device (e.g., if foggy weather or other lack of clarity outside). In yet another aspect, the light can automatically turn on and/or off based on a timer, motion detection sensor (e.g., light turns on based on a motion sensors detection of movement within a proximity of the device), object recognition technology (e.g., based on infrared, optical, radio frequency, sound, vibration, or magnetism sensors).

In another aspect, an embodiment of the device can comprise a base element capable of swiveling such that the bulk of the device can rotate using the swiveling base. Furthermore, in an aspect, the base can include wheels that allow the device to move between location A and location B. For instance, the device can sit on a dock or be moved between the dock and the curb to assist delivery personnel convenient access to deposit a package within the device. In another aspect, the wheels may be motorized such that the device can move on its own absent user-based manual movement. In another aspect, the wheels can be attached to a bottom-most compartment thereby allowing the device to become autonomously detachable from a docking structure (e.g., un-dock) and travelling to the curb of a dwelling to receive an item or drop an item for delivery and then move back into the docking structure (e.g., re-dock) and lock itself within the dock. Such dock and undock capability allows for intelligent movement of the device and secure locking of the smart mailbox device when no movement occurs.

In another embodiment, the smart mailbox device can include a surveillance camera capable of capturing a video and/or audio feed of the surrounding environment around the device. The surveillance feed is readily accessible for the user to view and/or hear on demand, allowing a user to monitor the box as desired. In yet another embodiment, the device can include an alarm system capable of making a loud noise or alerting various users upon an occurrence of tampering with the device. In another embodiment, the device can send an audio or video recording of a transaction (e.g., delivery, pick-up, access to a storage compartment by a non-owner user, attempted theft, etc.) as recorded by cameras and microphones installed within or on the encasing of the device (e.g., on top of the device) and inside the compartments. As such, notifications based on usage or transactions associated with the device can be sent to users via text, voice, email, sound, and/or visual messages.

In another embodiment, the device can comprise a compartment capable of storing laundered clothes, dry-cleaned clothes, new clothes, and/or other articles of clothing (e.g., apparel). For instance, a dry cleaning company can pick-up soiled clothes stored by a user-owner in a laundry compartment of the smart mailbox device and drop-off clean clothes belonging to a user-owner in the same or different laundry compartment of the device without the user ever seeing the dry-cleaning provider. In other embodiments, the device is capable of being fitted with decorative skins to allow users to change the look of the device exterior. For instance, a themed skin for various holidays (e.g., Halloween, Christmas, national holidays, festivals, solar skins, etc.) can be fitted to overlay the device exterior. Also, in an aspect, decorative lights can be used to decorate the device.

In another embodiment, the device can dispense items to users (e.g., candy for Halloween, drinks for guests, etc.) for various purposes. In an embodiment, one or more compartments can expand in accordance with a command. Thus the compartment serves as a box and there are telescopic boxes within the compartment box, where the telescopic boxes can fold out of the compartment thereby expanding it. In another embodiment, the device can comprise an integrated mailbox for special mail delivery of traditional non-parcel mail such as envelopes. In an embodiment, the device can extend from a roof of a home to allow for a heightened delivery drop by a drone. For instance, the drone drop compartment can extend from a home like a chimney or be permanently built into the roof of a building or extend telescopically to provide a suspended in air access point for aerial package drop offs or pick-ups.

Figure 5A:
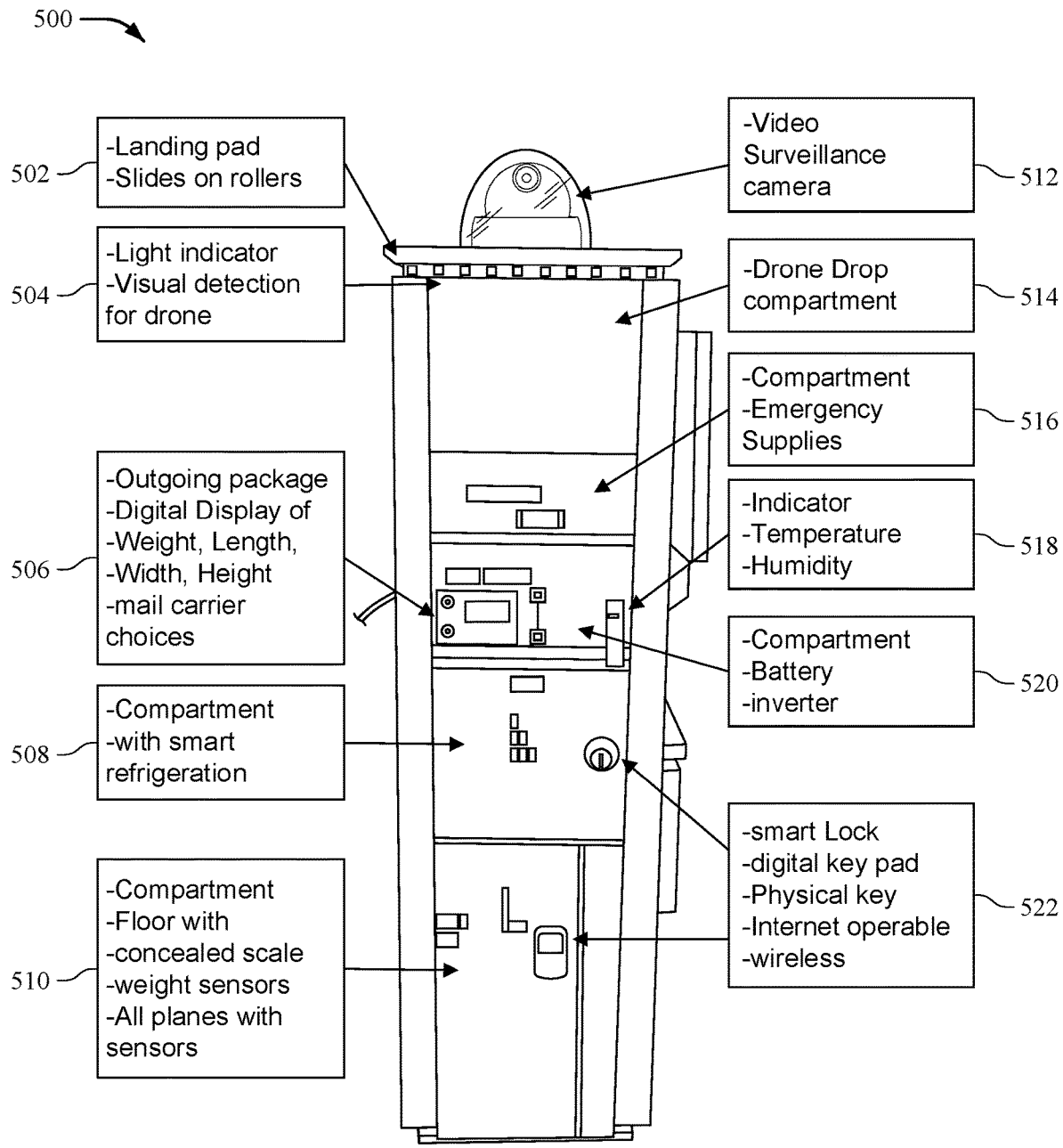
FIG. 5A illustrates a high-level block diagram of an example device 500 configured to securely keep items for storage, delivery and retrieval.

Turning now to FIG. 5A, illustrated is a non-limiting example of device 500 in accordance with various aspects and embodiments described herein. Device 500 includes a receptacle component 110, locking component 120, and access component 130. Furthermore, FIG. 5A illustrates a drone landing pad 532, a light indicator 504 that facilitates visual detection of a drone or other flying delivery vehicle, a digital display 506 that displays various information related to a stored item (e.g., weight, length, width, height, mail carrier choices) such as an outgoing package within the compartment, a smart refrigeration compartment 508 capable of keeping the inner compartment environment cool, a weighing compartment 510 capable of comprising features (e.g., floor with concealed or unconcealed scale, weight sensors, all plain's of the compartment retrofitted with sensors, etc.) that facilitate determination of a weight corresponding to a stored item, a camera element 512 that receives video surveillance footage of an environment surrounding the device, drop compartment 514 that capable of receiving packages dropped off by a drone or other flying vehicle, an emergency compartment 516 capable of storing emergency supplies, a temperature component 518 capable of detecting and communicating a temperature and/or humidity level inside a compartment and/or in the outside environment around the device, a battery compartment 520 that stores a battery to power device 500 and an inverter capable of changing direct current to alternating current, smart lock 522 (e.g., using locking component) capable of locking and unlocking compartments and comprising various features (e.g., digital key pad, physical key pad, internet operable, wireless operability).

Figure 5B:
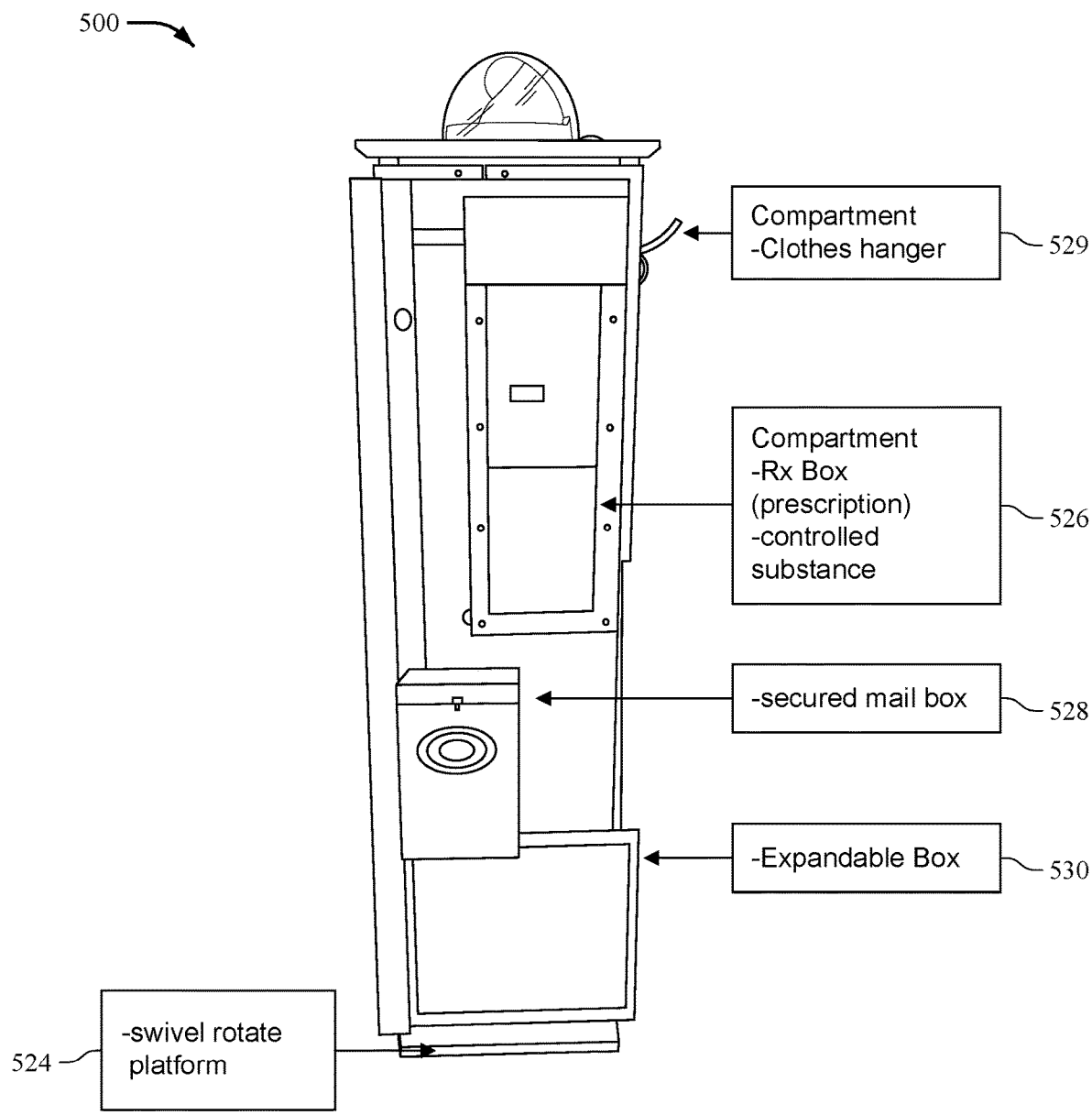
FIG. 5B illustrates a high-level block diagram of an example device 500 configured to securely keep items for storage, delivery and retrieval.

Turning now to FIG. 5B, illustrated is a non-limiting example of a side-view of device 500 in accordance with various aspects and embodiments described herein. In an aspect, a swivel rotate platform component 524 is located at the base of device 500 and facilitates the rotating of the bulk of device 500 for easy access to various sides of the device without having to move. The swivel rotate platform component 524 can stand stationary while the bulk of the device 500 can be rotated. In another aspect, disclosed is controlled substance compartment 526 capable of storing prescription medicines and/or controlled substances where the compartment has restricted access capabilities. Also disclosed is secure mailbox 528 configured to receive non-package mail in an easy manner including envelopes. In another aspect, illustrated is expandable box component 530 configured to expand a size of a compartment by sliding out nested walls, ceiling and floor panels of expandable box component 530. In another aspect, smart mailbox device 500 can comprise a cloth hanger 529.

Figure 5C:
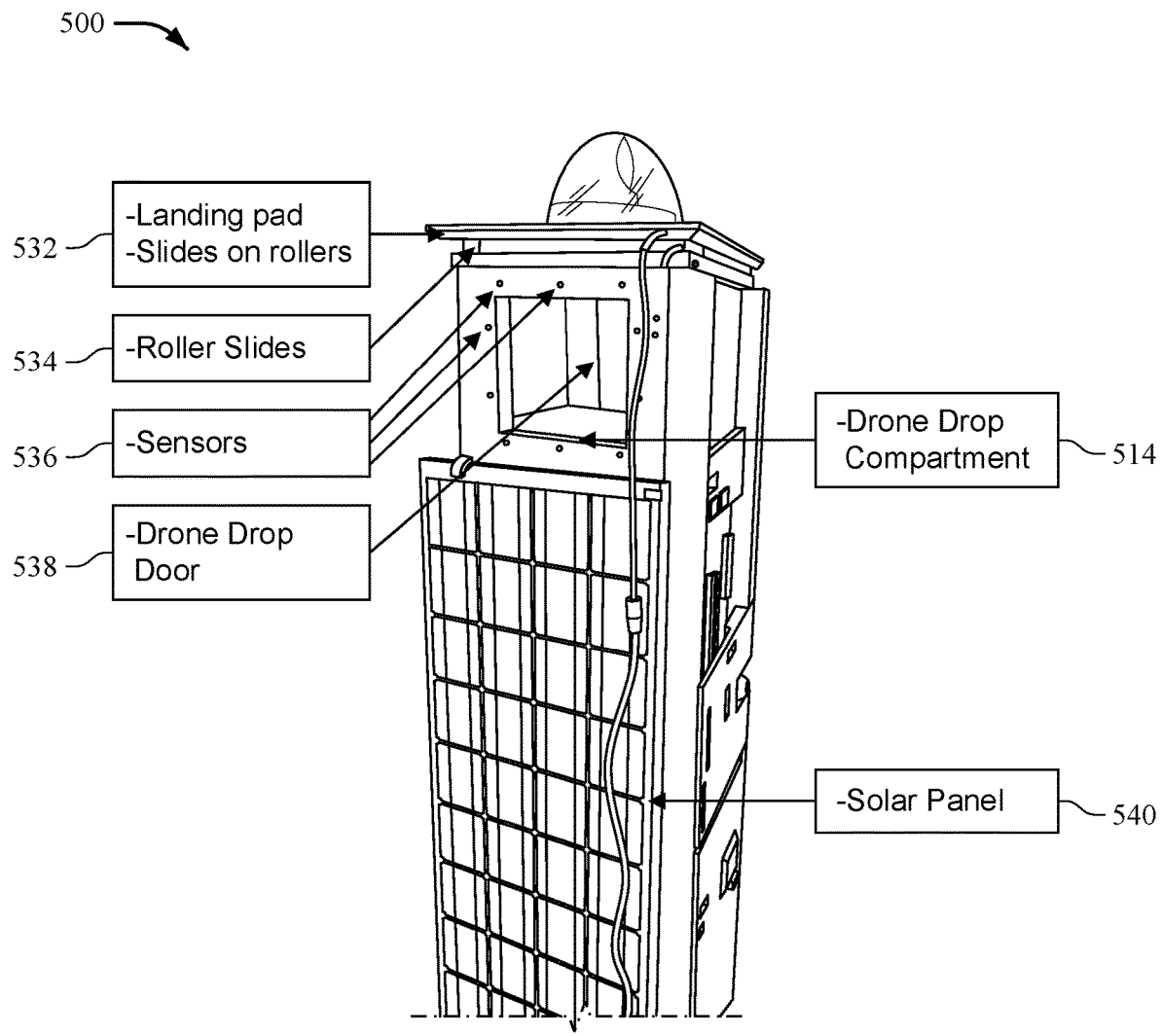
FIG. 5C illustrates a high-level block diagram of an example device 500 configured to securely keep items for storage, delivery and retrieval.

Turning now to FIG. 5C, illustrated is a non-limiting example of a backside-view of device 500 in accordance with various aspects and embodiments described herein. In an aspect drop compartment 514 can employ a landing pad 532 capable of facilitating a drone to land on the landing pad surface, roller slides 534 allowing the landing pad 532 to slide out of the raised portion of drop compartment 514, detection sensors 536 configured to detect the presence or absence of a drone or other flying vehicle to prepare drop compartment 514 to receive a package (e.g., opening compartment door) and prepare landing pad 532 to receive a drone (e.g., facilitate drone landing by unrolling outward), drone drop door 538 capable of opening and closing to receive and secure a package delivered by a drone or other flying vehicle. Furthermore, in an aspect, solar panel element 540 is capable of converting light into solar energy to power device 500.

Figure 5D:
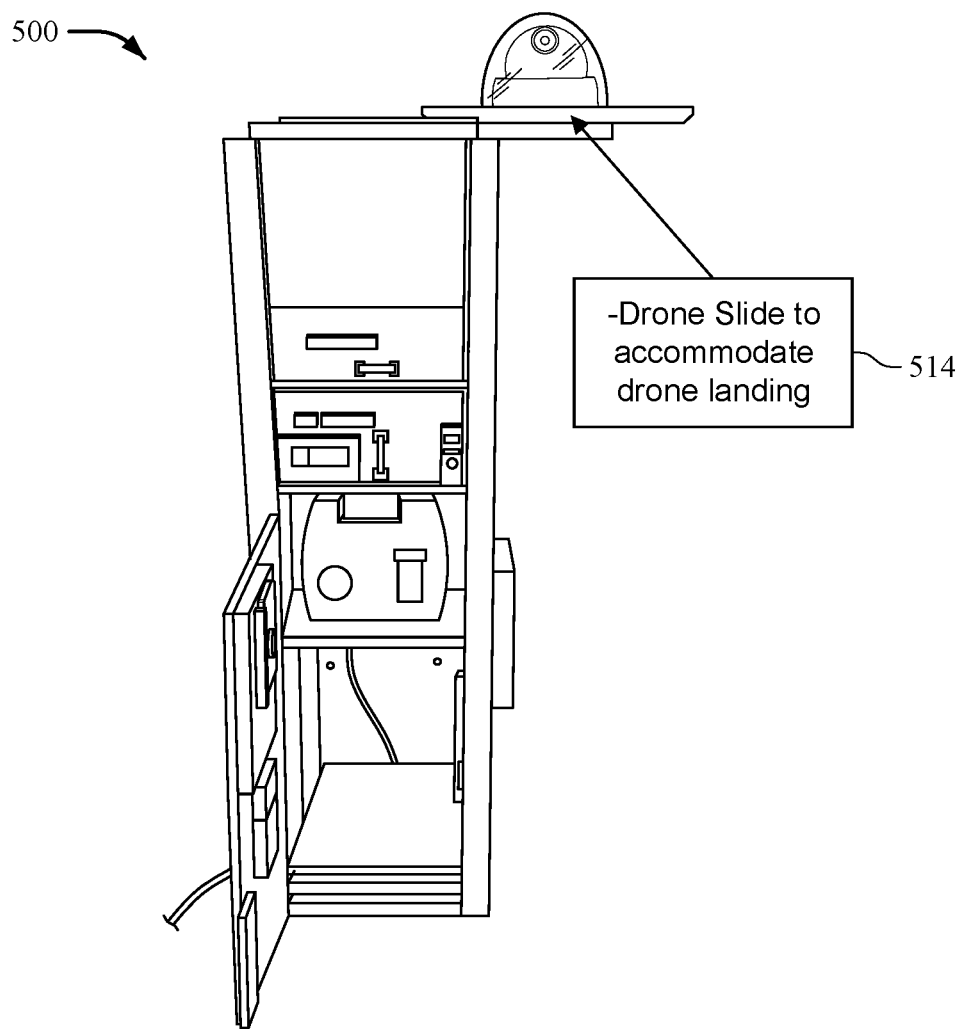
FIG. 5D illustrates a high-level block diagram of an example device 500 configured to securely keep items for storage, delivery and retrieval.
Figure 5E:
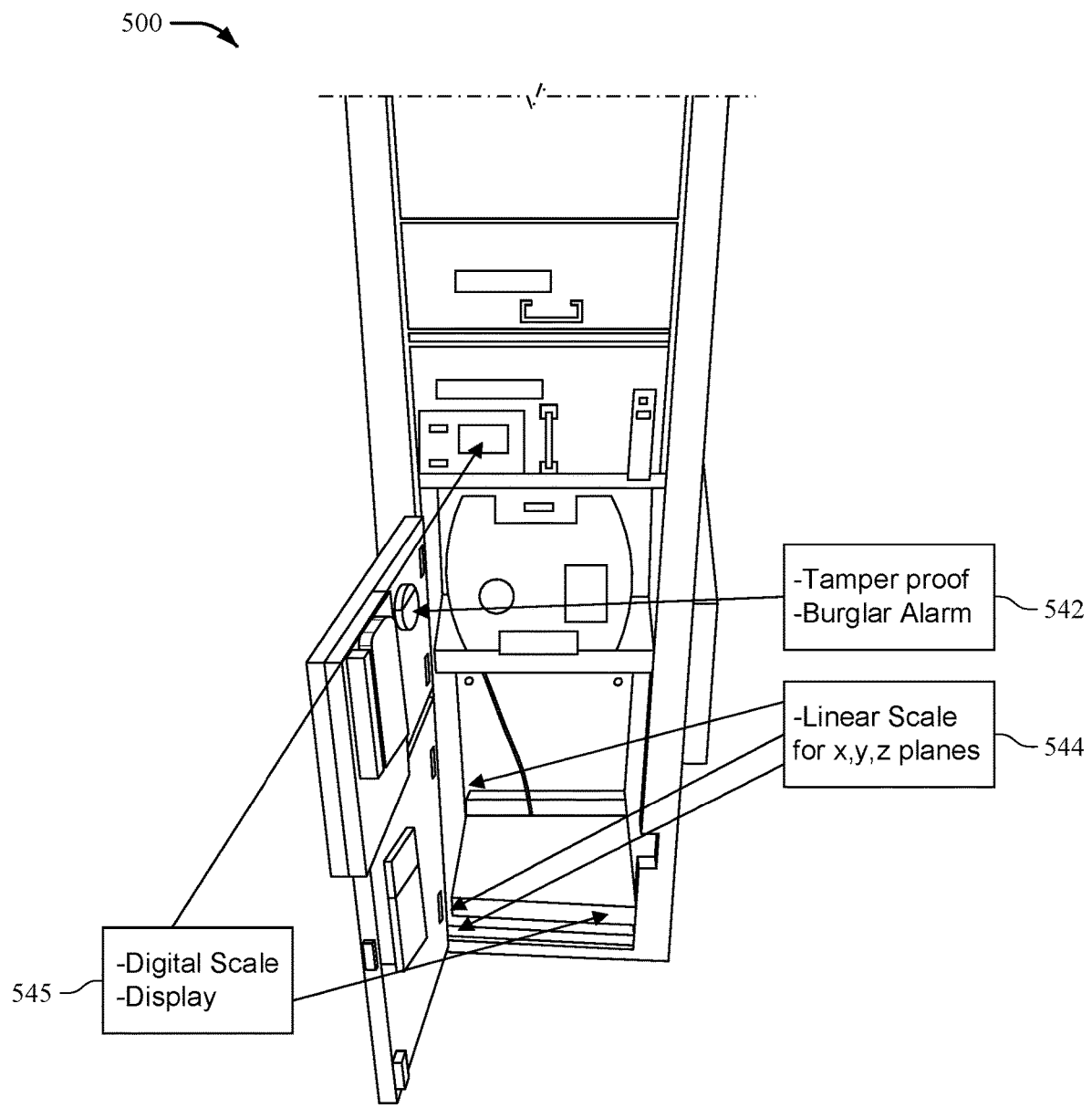
FIG. 5E illustrates a high-level block diagram of an example device 500 configured to securely keep items for storage, delivery and retrieval.
Figure 5F:
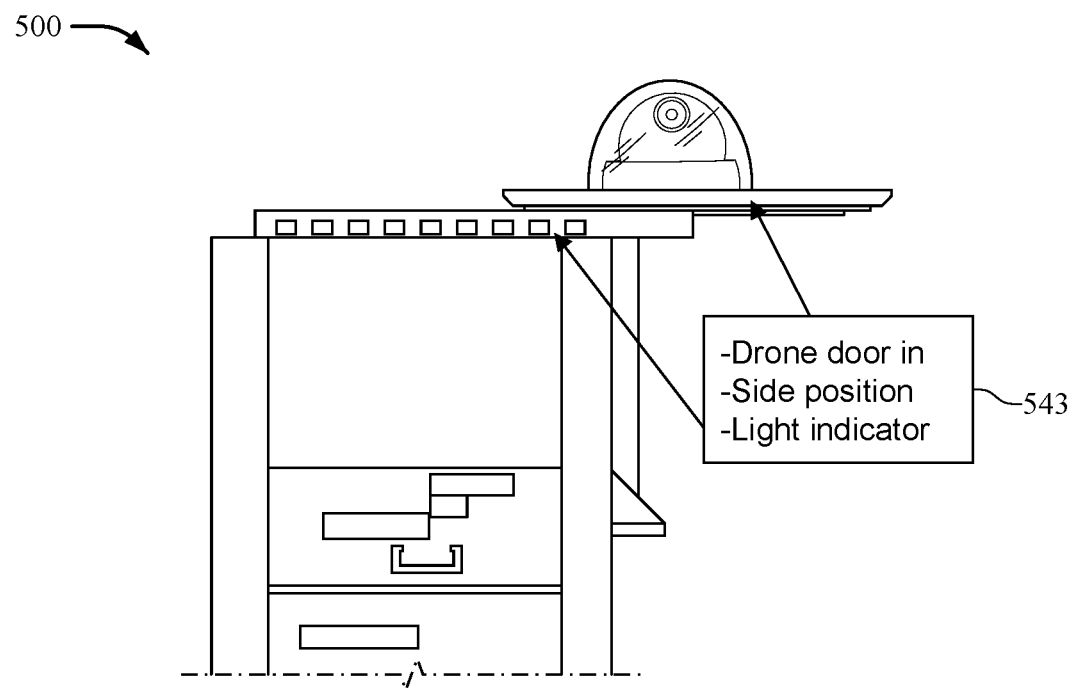
FIG. 5F illustrates a high-level block diagram of an example device 500 configured to securely keep items for storage, delivery and retrieval.

Turning to FIG. 5D, illustrated is a non-limiting example of the drone landing pad extended outward to accommodate a drone landing and drop into drop compartment 514. Also the drop compartment 514 is capable of sliding over to expose an opening in the drop compartment 514. Turning to FIG. 5E, illustrated is a non-limiting example of a tamper proof burglar alarm element 542 inside a door of the weighing compartment. Furthermore, illustrated is a linear scale 544 with X, Y, and Z planes. Furthermore, also disclosed is a digital scale 545 and accompanying display. Also illustrated is a drone door in slide position including a light indicator that indicates the drone door's readiness to slide. Turning now to FIG. 5F, illustrated is a drone door in the slide open position 543. Furthermore, the light indicator is on.

Figure 5G:
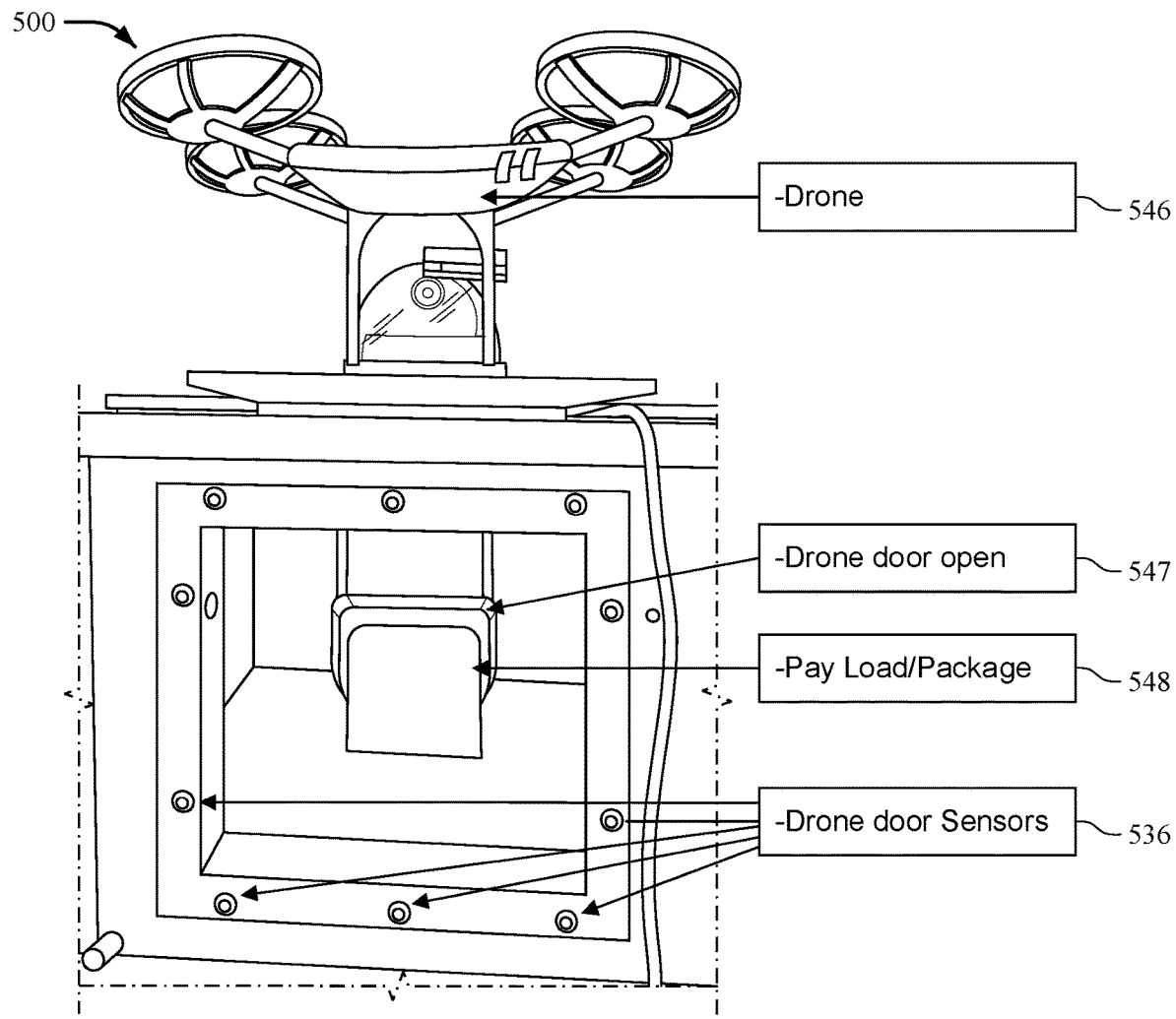
FIG. 5G illustrates a high-level block diagram of an example device 500 configured to securely keep items for storage, delivery and retrieval.
Figure 5H:
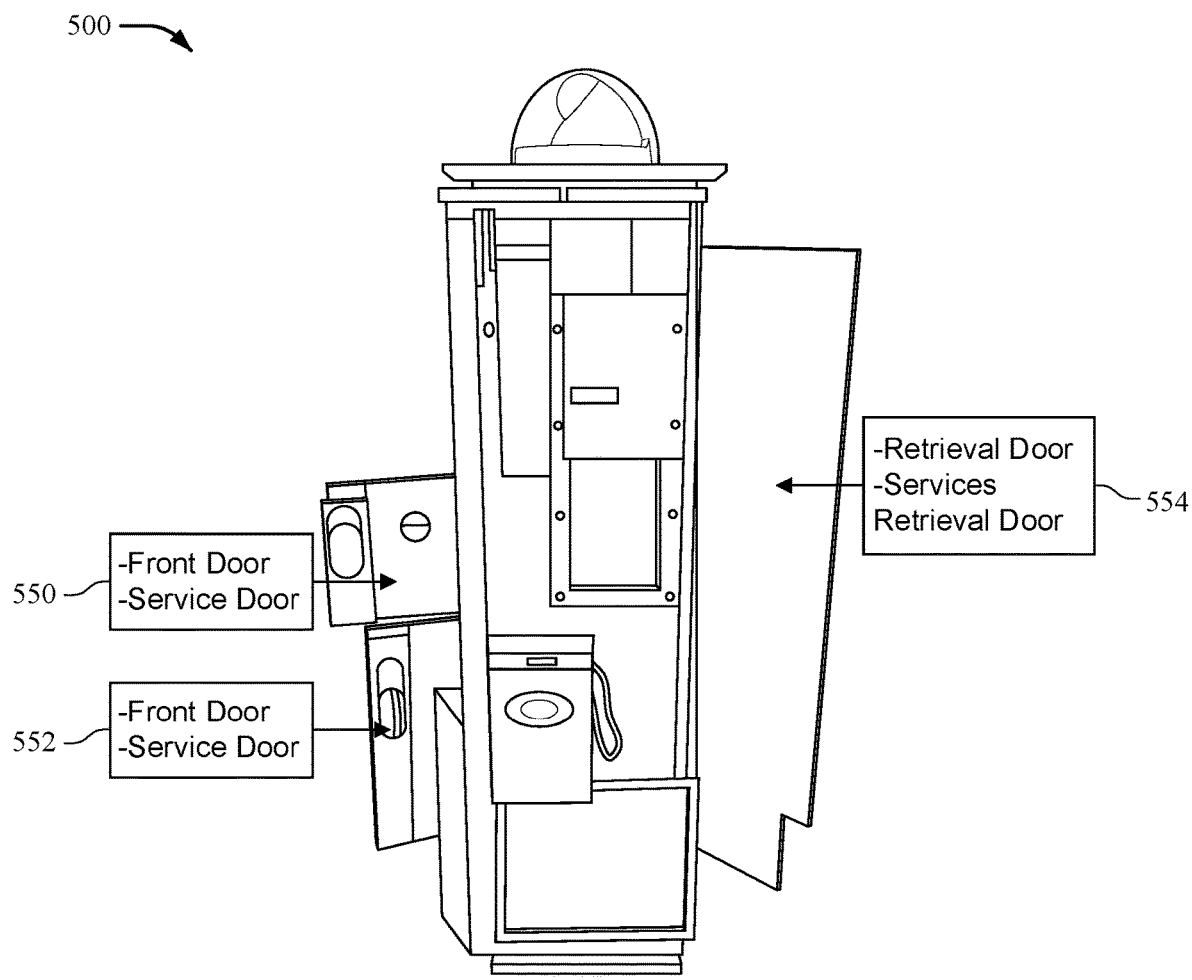
FIG. 5H illustrates a high-level block diagram of an example device 500 configured to securely keep items for storage, delivery and retrieval.

Turning now to FIG. 5G, illustrated is a drone 546 that has landed on the roof of device 500 and the drone door is open at 547 and drone 546 is perched on the ceiling of drop compartment 514. Furthermore, the payload 548 (e.g., package) has been dropped into the drop compartment 514. The drone detection sensors 536 are also illustrated, which detect the presence or absence of the drone and coordinate the opening and closing of the door based on the presence or absence of drone 546. At FIG. 5H, illustrated is front door 550 to a refrigeration compartment 508 and a front door 552 to weighing compartment 510 and both first front door 550 and second front door 552 are accessible to delivery or service personnel. In another aspect, a retrieval door 554 can facilitate access to all compartments by an owner of device 500. Furthermore, retrieval door 554 can be located within a dwelling and first front door 550 and second front door 552 can be located in an external environment (e.g., outside).

Figure 6:
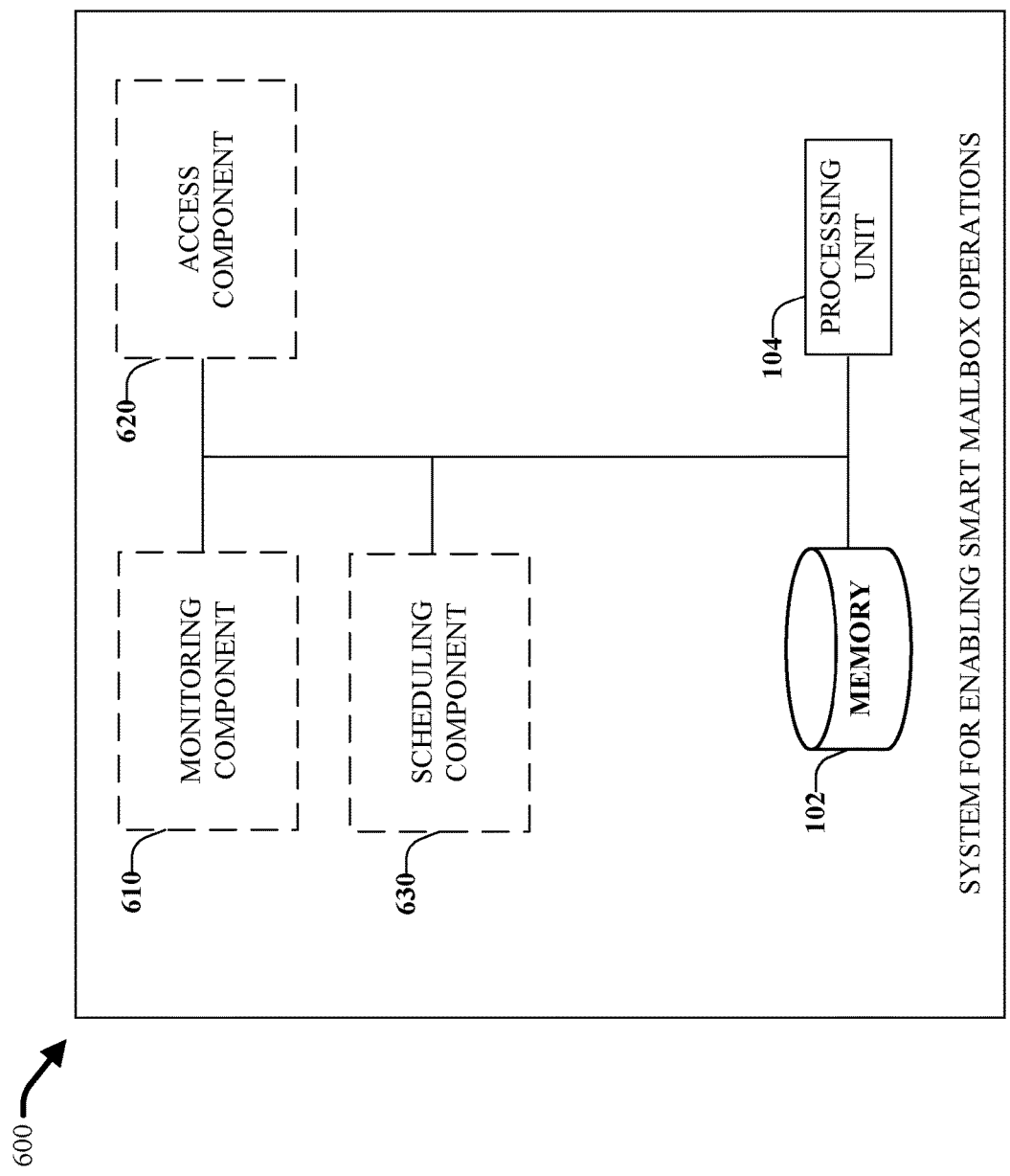
FIG. 6 illustrates a non-limiting embodiment of a system 600 that facilitates the secure storage, delivery, and retrieval of items associated with a smart mailbox device.

Referring now to FIG. 6, presented is a non-limiting example system 600 configured to facilitate operation of the disclosed secure storage devices disclosed herein. In one or more embodiments, a system can include a computer-readable storage media having stored thereon computer executable components, and a processor configured to execute computer executable components stored in the computer-readable storage media. These components can include a monitoring component 610 configured to monitor a set of activities associated with an electronic storage device that stores a set of delivery items, wherein a first subset of activities of the set of activities comprise any of a delivering of a first subset of delivery items of the set of delivery items or accessing the first subset of delivery items of the set of delivery items, and wherein the electronic storage device comprises a set of storage compartments.

The system can further include an access component 130 configured to temporarily unlock a first door corresponding to a first subset of storage compartments of the set of storage compartments by a first user device based on satisfaction of a first set of access criteria or continually unlock the first door by a second user device based on satisfaction of a second set of access criteria. Also, the system can include a scheduling component 630 configured to manage a set of scheduling tasks of the electronic storage device, wherein a first subset of scheduling tasks of the set of scheduling tasks represent a coordination of a first subset of storage compartments of the set of storage compartments for receipt of the first subset of delivery items based on a set of storage criteria, wherein the coordination is in accordance with the first subset of activities.

In various additional embodiments, a computer readable storage device (e.g., mobile device, tablet, etc.) is provided that includes instructions that, in response to execution, cause the system including a processor to perform operations, including monitoring, accessing, and scheduling tasks associated with the smart mailbox device. In FIG. 6, presented is a system 600 configured to facilitate various operations associated with the device embodiments (e.g., device 100-device 500). In an embodiment, the system is integrated into the device embodiments and provides an infrastructure that allows users to interact with the device. For instance, the system can allow a merchant to use an API associated with the device to determine if the device is installed at a delivery location.

In another aspect, the scheduling of a package delivery to the device and into a storage compartment of the device can be accomplished using system 600 and other system embodiments. Furthermore, in an aspect, disclosed systems can determine device functions based on the package scheduled to be delivers. For instance, the system can facilitate scheduling of a package to be delivered and dropped in refrigeration compartment if the package contents include fresh fruit or produce that require refrigeration. The system can also be used to facilitate the creation of an access code for a delivery person and ensure a corresponding compartment of the device is updated to accept such access code. As such, the system is an integral part of the disclosed devices and facilitates device operations and tasks.

In an aspect, system 600 employs a monitoring component 610 configured to monitor a set of activities associated with the smart mailbox device (and alternative device embodiments). The smart mailbox device, as disclosed, can perform numerous activities that facilitate the storage, receipt, and delivery of items such as packages. Such activities include, allowing refrigerating stored items, heating stored items, facilitating delivery of items (e.g., via air, land, or by various personal, etc.), surveying the surrounding environment around the device, weighing stored items, and other such activities.

Thus, monitoring component 610 can monitor activities performed by the smart mailbox devices and aggregate data associated with such activities. For instance, monitoring component 610 can monitor when an item is delivered, what compartment the item has been stored within, the type of item that has been delivered, the dimensions of the item, the weight of the item, the temperature of the compartment where the item is stored, the time the item was delivered, the user whom delivered the item, video and audio footage of the delivery, and other such aspects associated with the delivery of the item. In another aspect, monitoring component 610 can monitor the delivery of items from drones, identify a particular drone, monitor data associated with the drone's load bearing capacity and weight exerted on a landing pad, and other such information related to the drop-off by a drone.

Furthermore, in an aspect, monitoring component 610 can monitor smart mailbox device activities associated with sending items as well. For instance, monitoring component 610 can determine a compartment in which a sent package is stored, the time at which the package was dropped into the compartment and received by a delivery person, the postage paid on the package, the weight of the package, the environmental conditions associated with the storage of the package, the user whom deposited the item for storage, the user whom picked up the item for delivery, video and audio footage associated with the package deposit and pick-up, and other such aspects associated with the sending of items. In another aspect, monitoring component 610 can monitor the capability of a drone to pick-up a package from the smart mailbox device, such as the time of pick-up.

Furthermore, in an aspect, monitoring component 610 can monitor smart mailbox device activities associated with storing items. For instance, monitoring component 610 can monitor the dimensional adjustments of a storage compartment relative to a store package (e.g., in case the storage compartment has been adjusted or enlarged to fit a package). In another aspect, monitoring component 610 can monitor the storage conditions within a compartment such as the temperature, humidity, lighting, item weight, dimensions, maximum package weight sustainable, location within the smart mailbox, and other such conditions. Also, monitoring component 610 can monitor the frequency and timings associated with a locking and unlocking of compartment doors as well as opening and closing of compartment doors. Furthermore, monitoring component 610 can monitor the particular door being locked, unlocked, opened and/or closed such as a front door or a back door of a compartment in some device embodiments.

In another aspect, monitoring component 610 can monitor the GPS coordinates of the smart mailbox device, a user of the smart mailbox device (e.g., delivery person within a proximity of the device as determined by an authorized device such as a tablet or mobile phone), and/or a drone or delivery vehicle. Furthermore, monitoring component 610 can facilitate a determination of whether a drone is compatible for use with smart mailbox device and what dimensions and weight or packages can be supported via drone delivery. In yet another aspect, monitoring component 610 can monitor the items submitted to a refrigeration compartment, a heated compartment, a controlled substance compartment (including expiration dates, users accessing the compartment, and other such information associated with the contents of the controlled substance compartment), a laundry compartment (including special storage care requirements of such stored laundry), an emergency compartment (including expiration dates, battery power, inventory replenishment needs, etc.), solar power elements of mailbox device (e.g., charge associated with each panel, light absorption, energy conversion statistics, etc.). Also, monitoring component 610 can monitor other features in connection with smart mailbox device such as use of the alarm system, notifications received and sent related to the packages received and sent, audio and video recordings, biometric based locking mechanisms associated with the device, GPS-based tracking of users and vehicles associated with the device.

In another aspect, system 600 can employ a permission component configured to temporarily unlock a first door corresponding to a first subset of storage compartments of the set of storage compartments by a first user device based on satisfaction of a first set of access criteria or continually unlock the first door by a second user device based on satisfaction of a second set of access criteria. In connection with access component 130, the permission component can grant permission to access component 130 to unlock or to locking component 120 to lock a door. Permission component can receive an access code input into the device (e.g., using an interface component 140 or a user device 150) and verify the validity of the code as well as authenticate the user or user device sending the code.

As such permission component in connection with the device access component 130 can grant access to one or more storage compartments by a user, a delivery person, a flying vehicle, etc. Furthermore, permission component can authenticate the restricted access codes to restricted access compartments. In another aspect, permission component can verify a digital identification token of a drone to facilitate allowance of the drone to access the drop compartment. As such, permission component can function in connection with device components to grant permission for doors to be unlocked, locked, opened, closed. Furthermore, permission component can authenticate and validate a user for managing operations in connection with the device such as regulating a temperature setting of a compartment, authorizing payment of postage in connection with a package and/or accessing video and/or audio footage. Permission component can grant a user permission to access or operate the device in numerous respects.

In another aspect, system 600 can employ scheduling component 630 configured to manage a set of scheduling tasks of the electronic storage device, wherein a first subset of scheduling tasks of the set of scheduling tasks represent a coordination of a first subset of storage compartments of the set of storage compartments for receipt of the first subset of delivery items based on a set of storage criteria, wherein the coordination is in accordance with the first subset of activities. In an aspect, the smart mailbox device can operate intelligently to understand how to manage the storage of items within its various compartments. For instance, system 600 can employ scheduling component 630 to determine a schedule to manage all various tasks associated with the smart mailbox device. In an aspect, scheduling component 630 can determine whether a compartment is unoccupied or occupied by an item or package. Thus, upon delivery of an item, scheduling component 630 can assign a compartment for storage of the particular item based on storage criteria.

For instance, a package requiring cool temperature conditions such as produce or groceries can be assigned to the refrigerator compartment. As such, scheduling component 630 in connection with monitoring component 610 can schedule a compartment that is determined to have a cold temperature (e.g., using monitoring component 610) to be unlocked upon an authorized delivery personnel inputting the proper access code. In another instance, scheduling component 630 can schedule the storage of packages in particular compartments according to package dimensions, a time associated with a compartment estimated to be unoccupied, a compartments particular ownership by a specific user (e.g., delivery assigned to a compartment owned by a single family member in a multi-family household).

Furthermore, in an aspect, scheduling component 630 can schedule the pick-up of items based on various conditions including the mechanism of pick-up (e.g., drone, truck, etc.) and a corresponding compartment to assign for storage of the package until pick-up. For instance, if a package is scheduled for pick-up via drone, scheduling component 630 can intelligently assign a drone drop compartment with a landing pad for storage of the package. Furthermore, if laundry is to be dropped off at a particular time, scheduling component 630 can assign a compartment with hangers and room for hanging clothes to be available during the time of drop off. As such, scheduling component 630 can work in connection with other components to effectively schedule and intelligently arrange the order of pick-up, drop-off, and storage of items.

Figure 7:
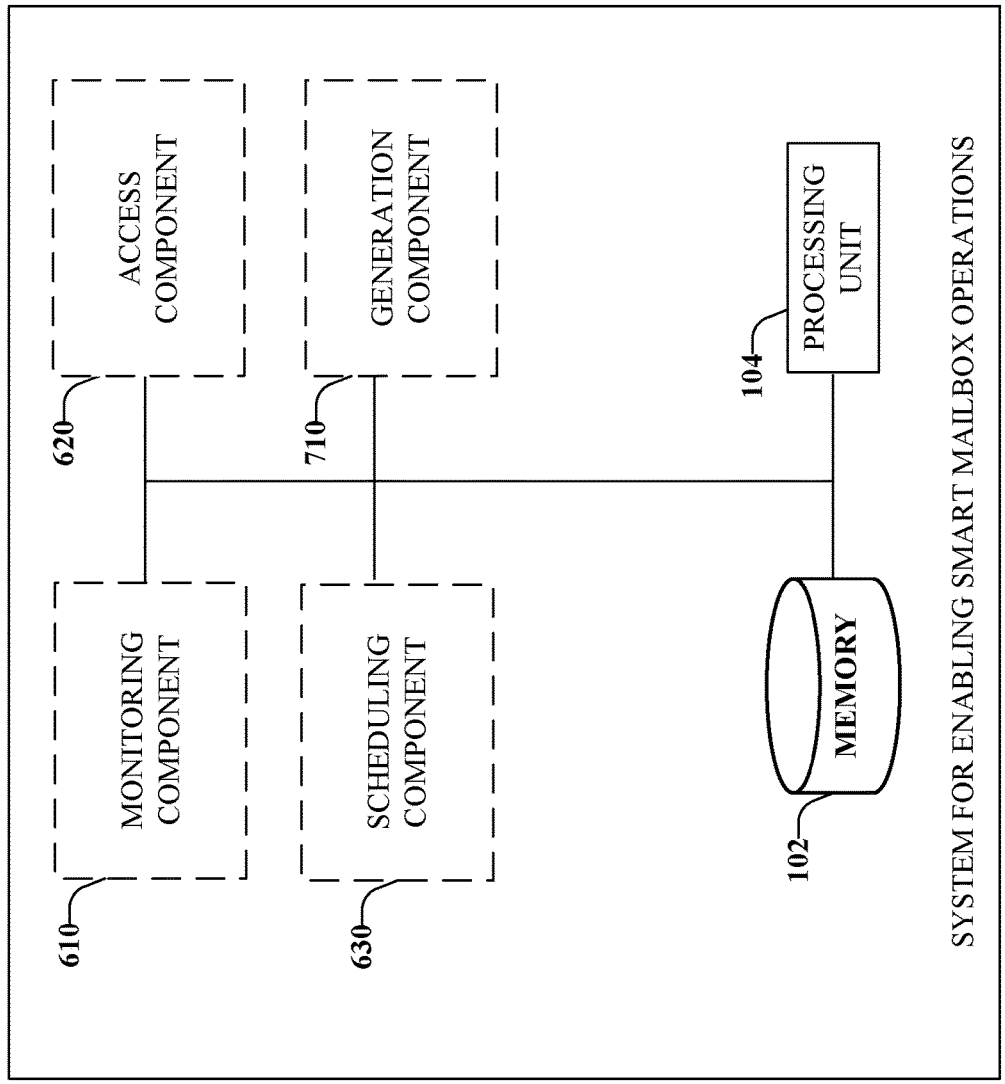
FIG. 7 illustrates a non-limiting embodiment of a system 700 that facilitates the secure storage, delivery, and retrieval of items associated with a smart mailbox device.

Referring now to FIG. 7, presented is a non-limiting example system 700 configured to facilitate operation of the disclosed secure storage devices disclosed herein. In one or more embodiments, a system 700 can include monitoring component 610, access component 620, and scheduling component 630. System 700 further comprises generation component 710 configured to generate data associated with the set of scheduling tasks, the set of activities, or the set of delivery items. In an aspect, a set of data can be generated (e.g., using generation component 710) related to particular scheduling tasks such as when an item has been accessed, what compartment the item has been accessed within, the weight of the item, the frequency of a compartment receiving a delivery or storing an item for pick-up, the number of same and different users during various transactions, and so on.

The data generated by generation component 710 can represent information associated with an activity performed by the device. For instance, if a load of laundry is regularly placed in a compartment for pick-up by a dry cleaner and regularly dropped-off by a dry cleaner at various times, the data can represent the timings and dates associated with the drop-off and pick-up as well as the size of the laundry bundle, weight of the laundry bundle, average cost of the service, and other such information associated with the activity and transaction. By generating data (e.g., using generation component 710) the system enables the device to operate in an intelligent manner (e.g., using predictive computer intelligence), such that it can learn to operate in ways that are consistent with the manner it is used by a particular user or group of users.

Thus, the device can intelligently implement commands or scheduling activities based off of generated data (e.g., using generation component 710) that represents historical trends of device usage. Thus if groceries are delivered on a particular day of the week, the device can intelligently schedule (e.g., using scheduling component 630) for a compartment to be unoccupied on that particular day of the week. Furthermore, the device can turn on the refrigeration compartment (e.g., using temperature component 210) and ready the temperature within the compartment for the grocery goods that are consistently delivered at a particular time during the week. The cooling mechanism can be turned on and turned off as well in accordance with the time the storage compartment is occupied and unoccupied respectively.

The generated data can also be integrated with other data points in order to provide additional value to users. For instance, in addition to an intelligent predictive capability, the device can utilize input data with generated data to facilitate device optimal functioning. For instance, the contents of a delivered item can be identified via a barcode scan, imported data from an application programming interface that provides item information (e.g., an online e-commerce site where the item was purchased), or other such data source. As such, an item can be identified via input data and the device can modify its behavior based on the needs of the identified item.

Thus, if an identified controlled substance is being delivered to the device then the device can ready the controlled substance compartment for delivery of the controlled substance including establishing stronger restrictive accessibility to the compartment in anticipation of the delivery. Furthermore, if the controlled substance and person for whom the prescription was issued is identified by input information (e.g., from a pharmacist records), the device can identify the proper user authorized to access the compartment. As such, numerous sets of data can be generated from device activities and such data can be integrated with other useful data related to the operation of the device.

In yet another aspect, the device can operate intelligently absent generated data and modify its behavior based on input information. For instance, if a perishable item such as ice cream is ordered for delivery to the device via an online retailer, the refrigeration compartment can automatically turn on and commence its cooling to an optimal ice cream preserving temperature based on the data from the online retailer specifying the delivery time frame, the item to be delivered, the user identity associated with the order and other such information related to the order. The device can make use of such information and data not internally generated including user input data such as the time frame a user will be away on vacation. Accordingly, the device can send information to reoccurring retailers that the user will not require their regular delivery of groceries, deliveries, supplies, and/or services. In another aspect, data can be generated as relates to a daily log of packages delivered, a daily log of packages retrieved, exceptions and delays to delivery or retrieval of packages, monthly summary logs of activities, and occupancy rates or usage rates of compartments. In an aspect, data can be provided in relation to devices operating at business centers, high density apartments, and/or single family homes.

Figure 8:
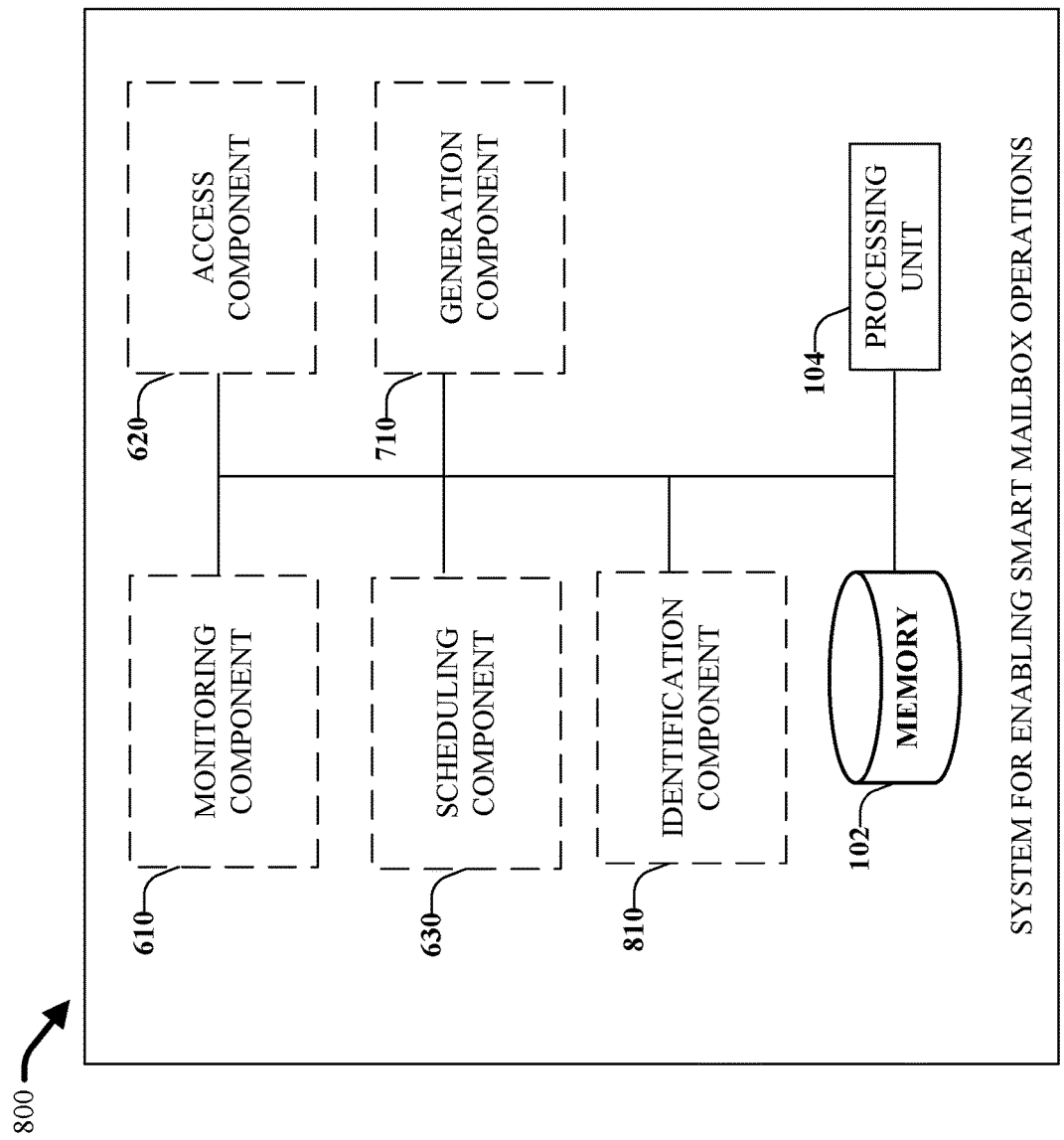
FIG. 8 illustrates a non-limiting embodiment of a system 800 that facilitates the secure storage, delivery, and retrieval of items associated with a smart mailbox device.

Turning now to FIG. 8, presented is a non-limiting example system 800 configured to facilitate operation of the disclosed secure storage devices disclosed herein. In one or more embodiments, a system 800 can include monitoring component 610, access component 620, and scheduling component 630, and generation component 710. System 800 further comprises an identification component 810 configured to identify a storage state of the first subset of storage compartments based on a first subset of data, wherein the first subset of data represents any of an environmental condition within the first subset of storage compartments, a level of available storage space within the first subset of storage compartments, a weight of the first subset of delivery items with the first subset of storage compartments, a time range between a first time of receipt of the first subset of delivery items and a second time of removal of the first subset of delivery items from the electronic storage device, or a dimensional characterization of the first subset of delivery items In an aspect, identification component 810 can identify in connection with detection and/or light sensors, pressure sensors, etc., the compartments that are occupied and unoccupied using various generated data. For instance, identification component 810 can make use of weight and/or pressure data indicating whether a compartment floor is bearing a particular quantity of weight to determine whether a compartment is occupied or unoccupied with or without a package or determine a change in weight and/or pressure between two points in time to identify when a compartment is occupied and unoccupied. In yet another aspect, identification component 810 can utilize light sensors to detect whether a storage compartment is occupied or unoccupied.

In an aspect, the light sensors can be embedded within a storage compartment such that they emit a beam of light. Upon receipt of a package or item within the housing of the storage compartment, the beam of light will be obstructed by the presence of the package. The identification component 810 can detect the presence or absence of a package based on the obstruction of the light beams emitted from the light based detection sensors and therefore identification component 810 can detect the presence or absence of a package based on such obstruction or unobstruction. Furthermore, in an aspect, the light sensors can also be utilized to identify the dimensions of a package by measuring the distance a light beam travels before reflecting off the package and back at the light sensor. Such distance measurement can facilitate a determination of package size, shape, and numerous other characteristics. Similarly, identification component 810 can base its determination of whether a compartment is occupied or unoccupied based on weight and/or pressure sensor data as well.

Also, identification component 810 can make use of data indicating whether a door has been locked, unlocked, opened, and/or closed to make an occupied or unoccupied determination. Furthermore, other such data to base an identification off of include whether a deliverer or user owner accessed the compartment, whether the compartment is maintaining various environmental conditions (e.g., temperature) to meet storage requirements of a package, and/or whether a storage compartment is storing at capacity or not based on an identity of dimension data of a package and or dimensional data (e.g., measurements such as length width height, depth of a compartment, measurements of walls, ceilings, and floors of packages and storage compartments, etc.) associated with the storage compartment housing the package.

Figure 9:
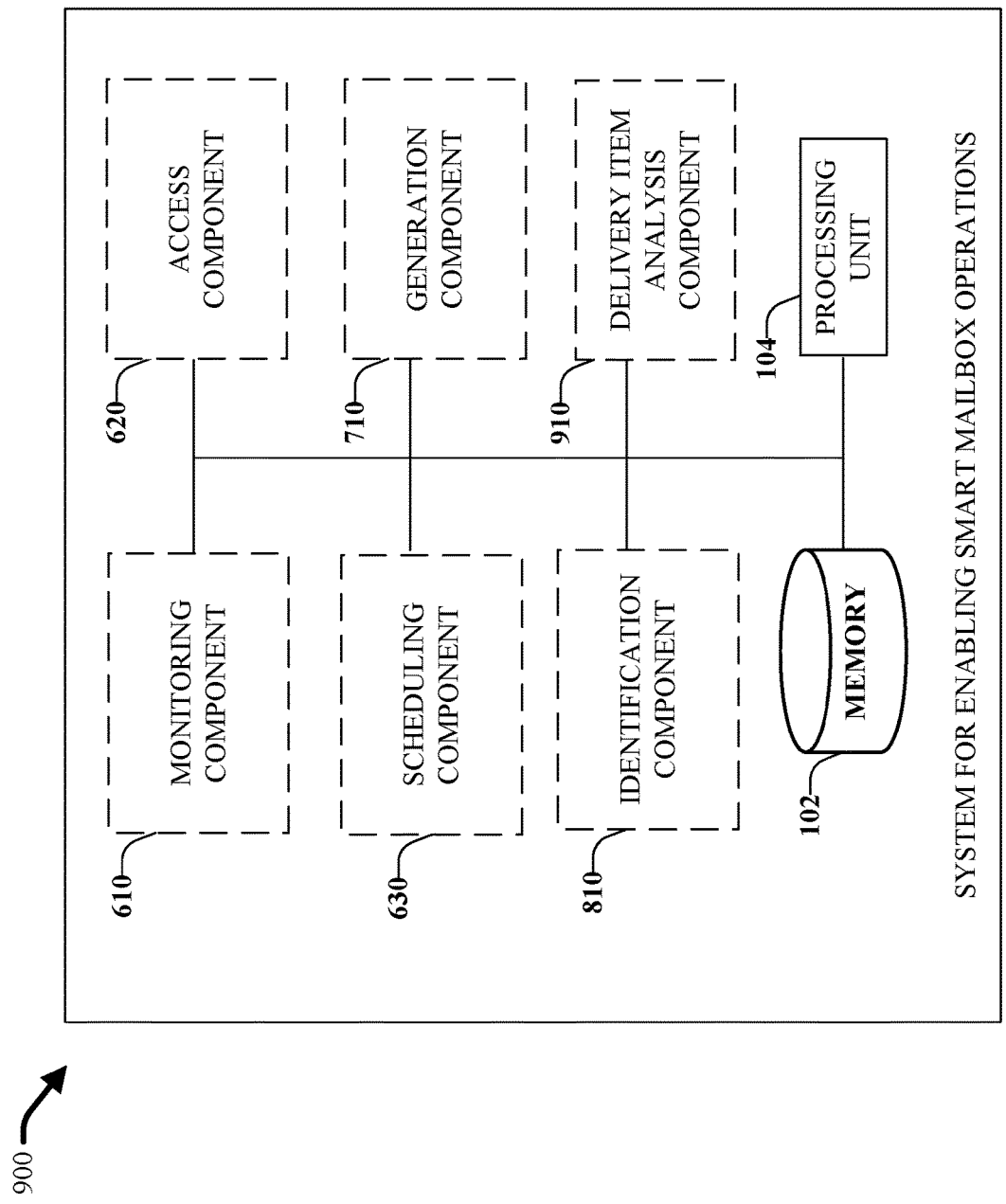
FIG. 9 illustrates a non-limiting embodiment of a system 900 that facilitates the secure storage, delivery, and retrieval of items associated with a smart mailbox device.

Turning now to FIG. 9, presented is a non-limiting example system 900 configured to facilitate operation of the disclosed smart mailbox devices disclosed herein. In one or more embodiments, a system 900 can include monitoring component 610, access component 620, and scheduling component 630, generation component 710, and identification component 810. System 900 can further employ a delivery item analysis component 910 that generates a set of data associated with a delivery item of the set of delivery items, wherein the set of data can comprise a delivery item weight, a delivery item postage cost, a delivery item temperature requirement, a delivery item security clearance requirement, a delivery item descriptive classifier, or a delivery item life span.

In another aspect, a set of data associated with the item stored within the storage compartment itself can be analyzed based on associated data and such data can be generated using delivery item analysis component 910. In an aspect, delivery item analysis component 910 can generate data that includes descriptive information regarding the contents of a delivered item such as price, year made, expiration date, product manufacturer, consumer rating associated with the product, labelling content associated with the product, item weight, item postage cost, item temperature requirements, and other such information.

Furthermore, in the instance of a controlled substance (e.g., alcohol, prescription drugs, tobacco, etc.), data can be generated such as age requirements to access the item, additional security clearance to requirements to access the compartment storing the item, a classification description of the item, storage conditions of the item, and other such criteria. For instance, if a prescription drug is stored in the compartment and delivered for a specific user, the access requirements to retrieve the drug can be heightened based on the data generated (e.g., using analysis component 910). The device can implement a multi-level authentication requirement to access the compartment such as a soft code input, driver's license and/or biometric validation such as voice, facial, fingerprint, and/or optical recognition validation. Thus delivery item analysis component 910 can generate particular data related to the item stored within the device in order to trigger various activities to be performed by numerous device components.

Figure 10:
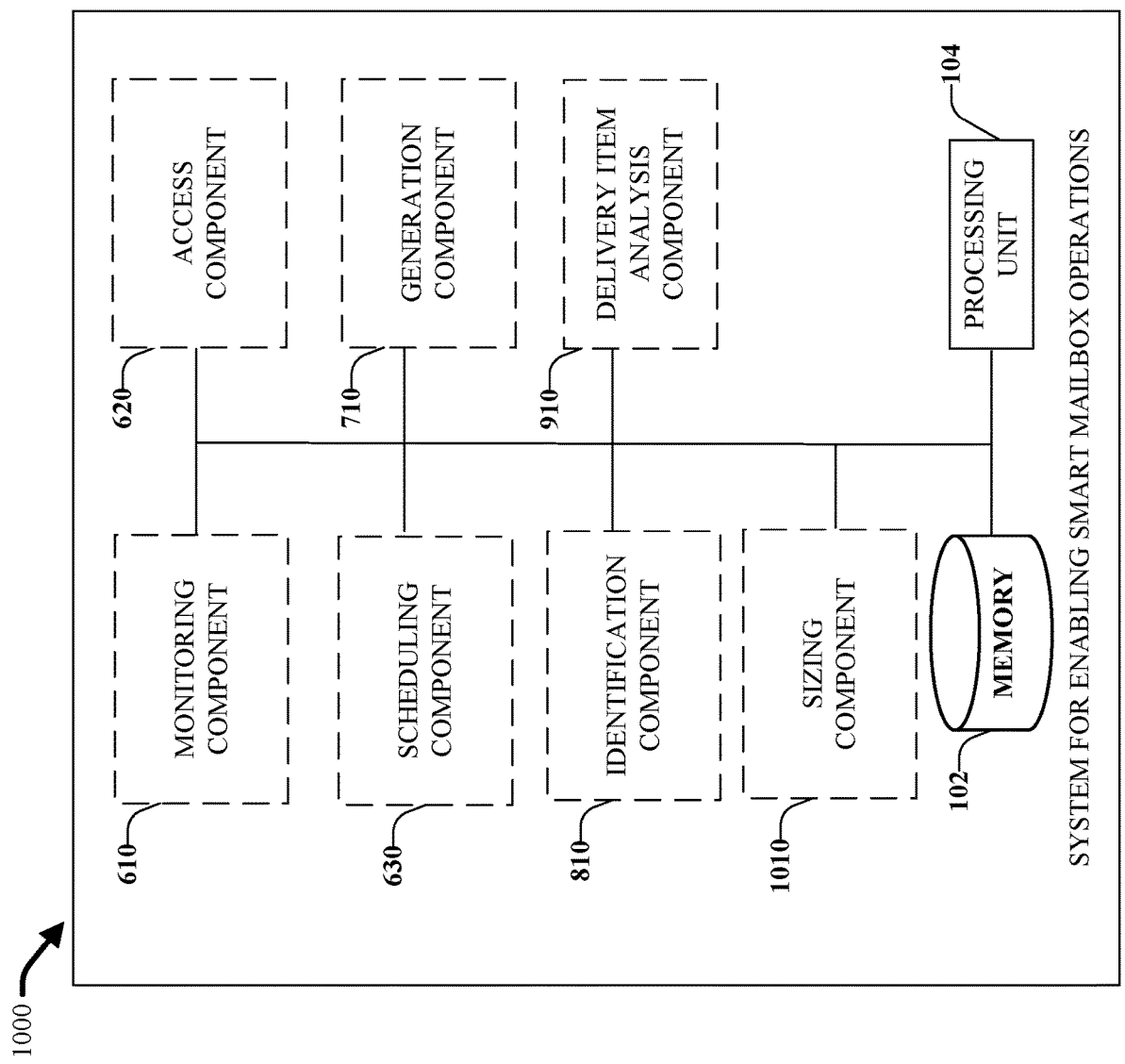
FIG. 10 illustrates a non-limiting embodiment of a system 1000 that facilitates the secure storage, delivery, and retrieval of items associated with a smart mailbox device.

Turning now to FIG. 10, presented is a non-limiting example system 1000 configured to facilitate operation of the disclosed smart mailbox devices disclosed herein. In one or more embodiments, a system 1000 can include monitoring component 610, access component 620, and scheduling component 630, generation component 710, and identification component 810, and delivery item analysis component 910. System 1000 can further employ a sizing component 1010 configured to adjust a first size of one or more dimension of the first subset of storage compartments based on a second size of the first subset of delivery items.

In an aspect, sizing component 1010 can automatically adjust the size of a compartment dimensions to fit the content of a storage item. For instance, if a storage item is too large to fit within a storage compartment, sizing component 1010 can automatically cause the compartment to unfurrow the nested walls, nested ceiling, and nested floor to elongate the storage compartment. In another aspect, the storage compartment can also not only elongate outward but also elongate upward such that sizing component 1010 can allow the nested walls and nested ceiling (e.g., nested within a compartment) to unfurrow horizontally and vertically out of a compartment.

In yet another aspect, sizing component 1010 can also retract the nested walls, ceilings, and floor in order to properly size a package. For instance, after the compartment is enlarged and once an item such as a package is placed within the compartment then sizing component 1010 can retract its size to fit (e.g., closely frame) the package more snugly within the compartment and prevent movement or damage to fragile items from any motion by the device as imposed by outside environmental factors (e.g., earthquakes, vandalism, etc.). As such, sizing component 1010 automatically re-sizes a compartment to facilitate the storage of items within its walls, ceiling, and roof.

In another embodiment, the system 1000 can also automatically facilitate the movement of the device off a docking mechanism and to various perimeters around a location such as a dwelling (e.g., a curb of a home) in order to automatically allow the smart mailbox device to move towards a delivery person or deliverer of a package. For instance, the smart mailbox device can automatically unhinge from a docking mechanism and roll over to a curb (e.g., using wheels located at the base) in order to meet a postage worker within their vehicle and allow for a simple drop off of an item for storage without the worker leaving their vehicle. The smart mailbox device can identify the delivery person (e.g., using GPS chip, authentication components, etc.) within a proximity of the device, then automatically roll over to the user and after receiving the payload roll back to its docking station. System 1010 can facilitate this automatic movement feature of the device as well.

Figure 11:
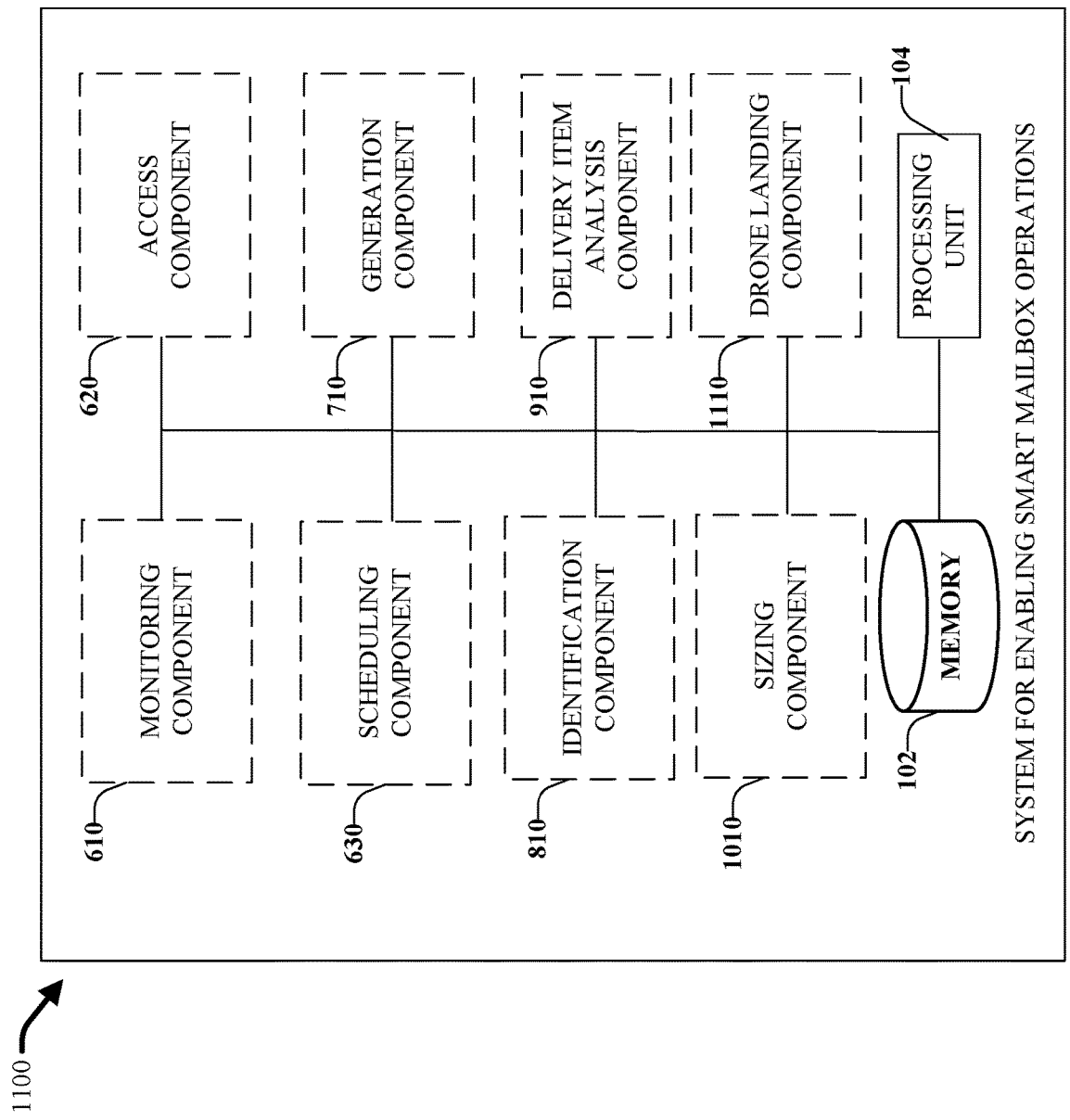
FIG. 11 illustrates a non-limiting embodiment of a system 1100 that facilitates the secure storage, delivery, and retrieval of items associated with a smart mailbox device.

Turning now to FIG. 11, presented is a non-limiting example system 1100 configured to facilitate operation of the disclosed smart mailbox devices disclosed herein. In one or more embodiments, a system 1100 can include monitoring component 610, access component 620, and scheduling component 630, generation component 710, and identification component 810, delivery item analysis component 910, and sizing component 1010. System 1100 can further employ drone landing component 1110 configured to expand or retract a landing pad of the smart mailbox device based on a presence or absence of a drone in accordance with a detection sensor of the electronic storage device.

In an aspect, drone landing component 1110 can facilitate the sliding outward or inward of a drone landing pad in connection with the detection or lack of detection of a drone carrying an item for delivery. In an aspect, drone landing component 1110 in connection with detection sensors and physical device elements such as a landing pad can direct the activities of the drone landing pad and drone drop compartment in association with a drone delivering a package. For instance, a drone can be detected (e.g., using a detection sensor) and drone landing component 1110 can send a signal to the drone landing pad and cause the landing pad to slide out in anticipation of receiving a drone to land on the pad.

Furthermore, in an aspect, drone landing component 1110 in connection with the door of the drop compartment can send a message for the door to open and receive the package carried by the drone upon the drone successfully landing on the landing pad or rim of the drone drop compartment. In another aspect, drone landing component 1110 in connection with the door can send a signal or message to the door to close and securely store the package based on receipt of the package within the drop compartment. Also, drone landing component 1110 can cause the landing pad (e.g., by sending a signal or message) to retract upon the drone leaving the proximity of the device and successfully delivering the item payload.

Figure 12:
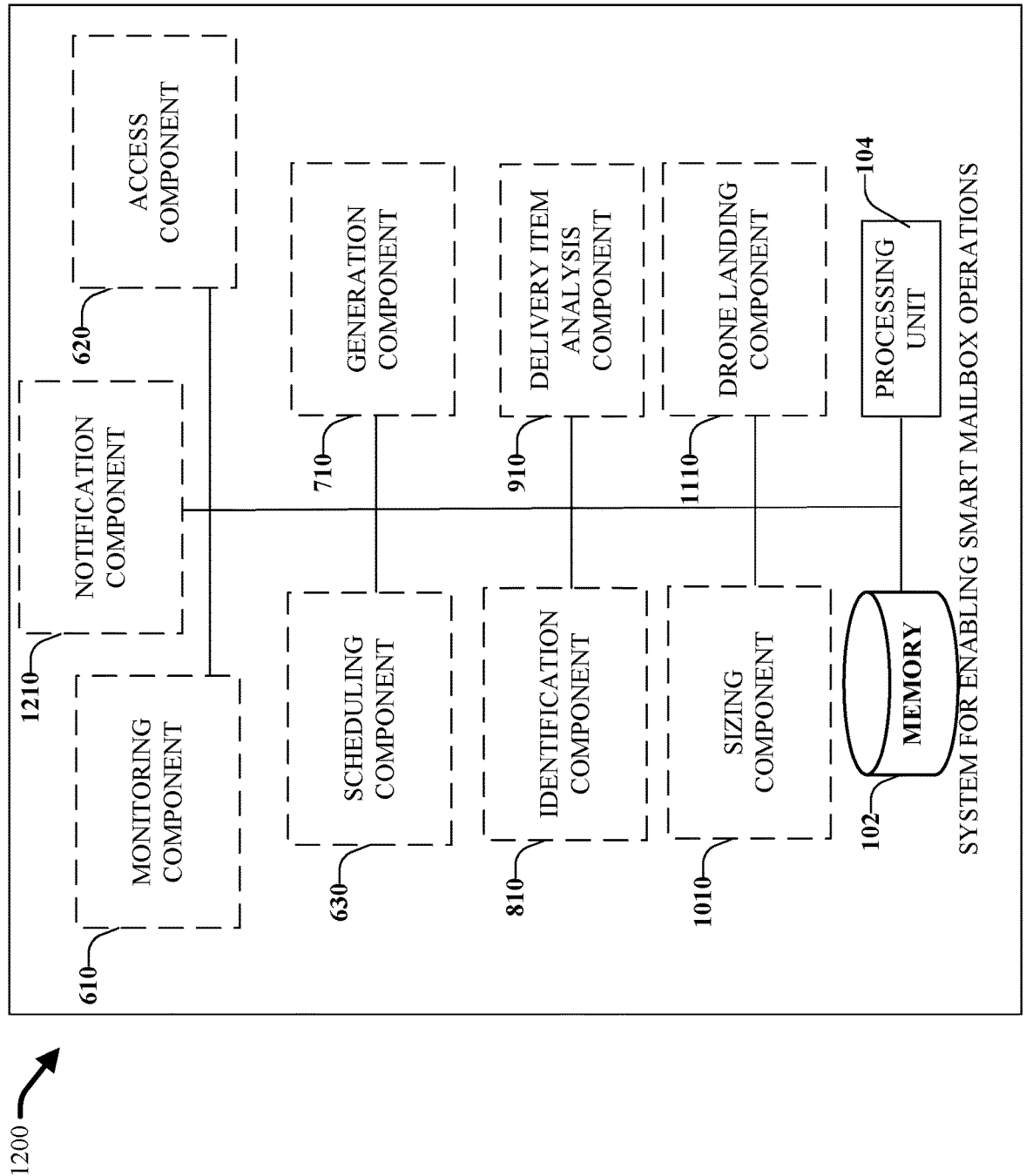
FIG. 12 illustrates a non-limiting embodiment of a system 1200 that facilitates the secure storage, delivery, and retrieval of items associated with a smart mailbox device.

Turning now to FIG. 12, presented is a non-limiting example system 1200 configured to facilitate operation of the disclosed smart mailbox devices disclosed herein. In one or more embodiments, a system 1200 can include monitoring component 610, access component 620, and scheduling component 630, generation component 710, and identification component 810, delivery item analysis component 910, sizing component 1010, and drone landing component 1100. System 1200 can further employ notification component 1210 configured to notify the second user device of a receipt within the first subset of storage compartments of the first subset of delivery items or a delivery from the first subset of storage compartments of a second subset of delivery items representing outgoing delivery items.

In an aspect, notification component 1210 can notify a second user device such as a tablet, a computer, a smart phone, a mobile device, and other such deices of receipt or pick-up of an item stored within a compartment. In an aspect, a notification can be sent (e.g., using network 116) to users and user devices (e.g., using notification component 1210) as relates to the occurrence of numerous activities associated with the smart mailbox. For instance, such activities can include users accessing compartments, failed attempts by users to access compartments, locking and unlocking of compartments, delivery notifications, pick-up notifications, expiration of item notifications, movement of the device notifications, warning notifications, and other such notifications.

The notification can comprise a notification that takes place at an interface of the device or a notification sent to a separate third party device such as a mobile phone or tablet. In an example, a user can receive a notification on their cell-phone, via e-mail, text, voice call, in-application notification, or other such mechanism to make them aware that a package has been delivered in a particular compartment of the smart mailbox. Furthermore, a notification can be followed-up that provides the specifications of the package (e.g., weight, time of delivery, dimensions of the package, etc.). Also, a video and/or audio notification can be sent to notify the user that there is video footage and an audio recording of the drop off of the package. These and other such notifications can be associated with the smart mailbox device to help notify a user of various activities occurring in real time as pertains to the smart mailbox device.

In yet another aspect, the system can employ a delivery platform infrastructure to help facilitate the delivery, receipt, and storage of items in the smart mailbox device. The delivery platform can be offered as a service to maximize delivery efficiency, minimize consumer interaction, and maximize utilization of the smart mailbox. The delivery platform can ensure safe and secure storage of delivery items, the facilitation of allowing consumers access to a broad spectrum of services (e.g., grocery, food delivery, apparel, laundry, etc.), local participation in the commerce of easy delivery of products and services (e.g., farm to table, UPS, DHL, peer to peer drop off, etc.), strategic partnerships (e.g., product distributors, grocery stores, delivery services, etc.), a subscription based access to consumers and users, the capability to provide behavioral tracking and analytics around usage of the device, the capability of optimizing logistical flows of products (e.g., fewer delivery trucks needed), the capability to intelligently schedule pick-up and delivery of items, the lack of need to be present during a delivery so that missing a delivery is not an issue (e.g., no disputes, no customer service calls needed), the convenience of not having to interact with delivery personnel (e.g., privacy maintained by owner, no need for door bells to be used with the device, etc.), a user can order and not think about the package until it arrives, and the user can retrieve a package anytime.

In a non-limiting example embodiment a delivery person can use the smart mailbox in the following manner: enter a passcode in the smart mailbox device, scan an address using a camera on a smart device (and provide additional information if necessary such as entering a company name, choosing an employee name), comparing and/or validating the scanned name or address against the pre-loaded authorized addresses on the device or a database, selecting a locker of adequate size or placing package into a preselected compartment size (as per scheduling component), storing the package and closing the door, notify the user or customer that a package has arrived. In another aspect, the compartment can be enlarged to fit the package.

In a non-limiting example embodiment, the notification mechanism can occur as per the following: a text or e-mail message is sent to a smart mailbox owner that a package has arrived, the message includes a link to a QR code and passcode, the customer scans the code on a camera (or enters a passcode if scan is not possible), the locker opens to retrieve the package, the deliverer receives a notification that the package was retrieved by the owner. In another aspect, the system can manage the smart mailbox as well as provide an infrastructure that allows a merchant to interact with the smart mailbox. The merchants can use an API associated with the smart mailbox to determine if a smart mailbox is installed at the deliver location and schedule delivery of a package into an available compartment that also has functionality appropriate for the contents of the package (e.g., refrigerated compartment for fresh fruits). When scheduling the delivery, the API can also create an access code for the delivery personnel and make sure that the corresponding compartment has the updated access code.

FIGS. 13-16 illustrate various methodologies in accordance with certain embodiments of this disclosure. While, for purposes of simplicity of explanation, the methodologies are shown as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram.

Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media. It is noted that the methods depicted in FIGS. 13-16 can be performed by various systems disclosed herein, such as systems 600, 700, 800, 900, 1000, 1100, 1200 and devices such as devices 100, 200, 300, 400, and 500A-H.

Figure 13:
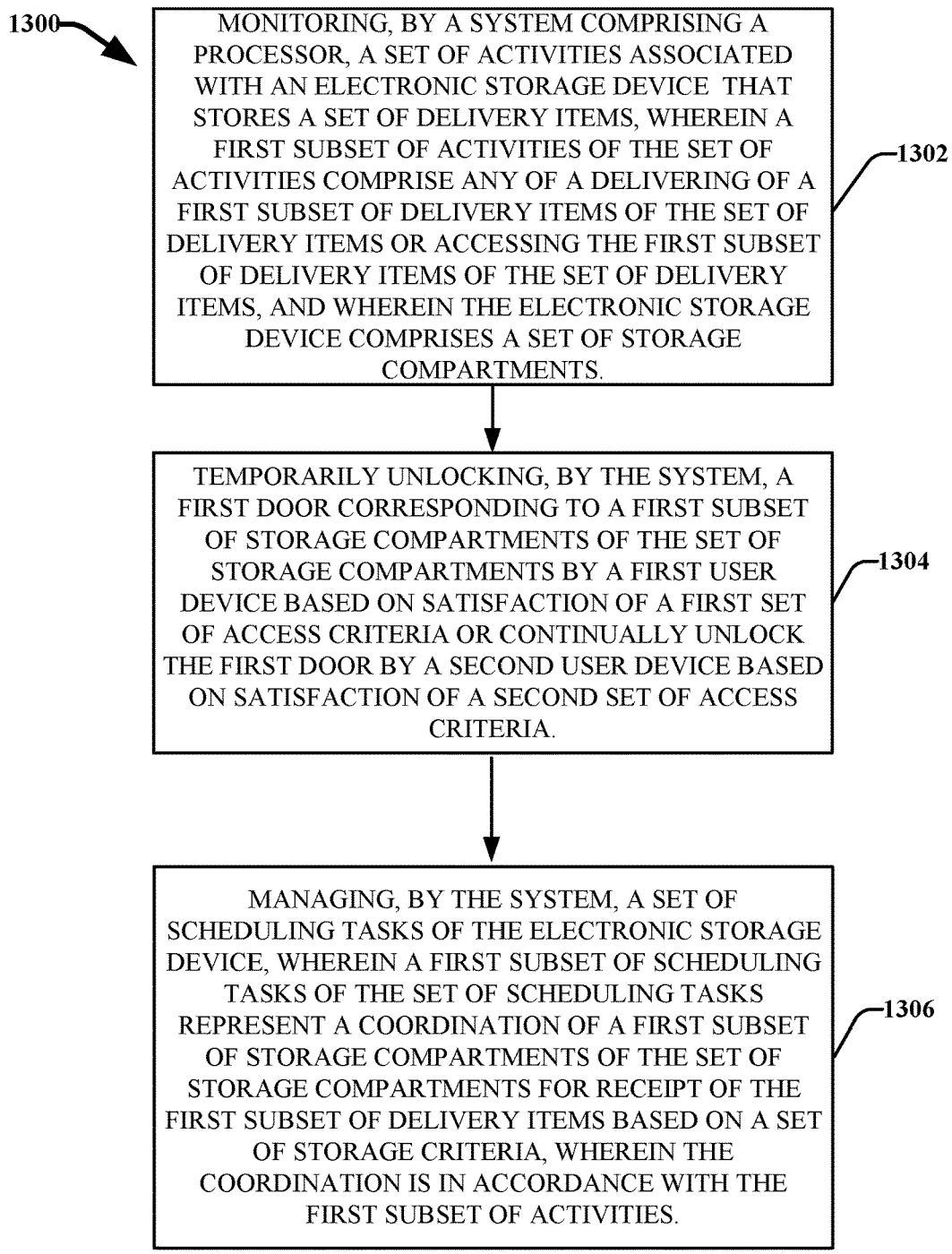
FIG. 13 illustrates a non-limiting example of a method 1300 for securely storing, delivering and retrieving items associated with a smart mailbox device.

FIG. 13 provides an example non-limiting method 1300 for operating a smart mailbox device. Repetitive description of like elements employs in systems, devices, and methods disclosed herein are omitted for sake of brevity.

At 1302, a set of activities associated with a smart mailbox device are monitored (e.g., using monitoring component 610) by a system comprising a processor, wherein the smart mailbox device stores a set of delivery items, wherein a first subset of activities of the set of activities comprise any of a delivering of a first subset of delivery items of the set of delivery items or accessing the first subset of delivery items of the set of delivery items, and wherein the smart mailbox comprises a set of storage compartments. At 1304, a first door corresponding to a first subset of storage compartments of the set of storage compartments is unlocked (e.g., using access component 130) using the system, by a first user device, based on satisfaction of a first set of access criteria or continually unlock the first door by a second user device based on satisfaction of a second set of access criteria. At 1306, a set of scheduling tasks of the smart mailbox device are managed (e.g., using scheduling component 630), wherein a first subset of scheduling tasks of the set of scheduling tasks represent a coordination of a first subset of storage compartments of the set of storage compartments for receipt of the first subset of delivery items based on a set of storage criteria, wherein the coordination is in accordance with the first subset of activities.

Figure 14:
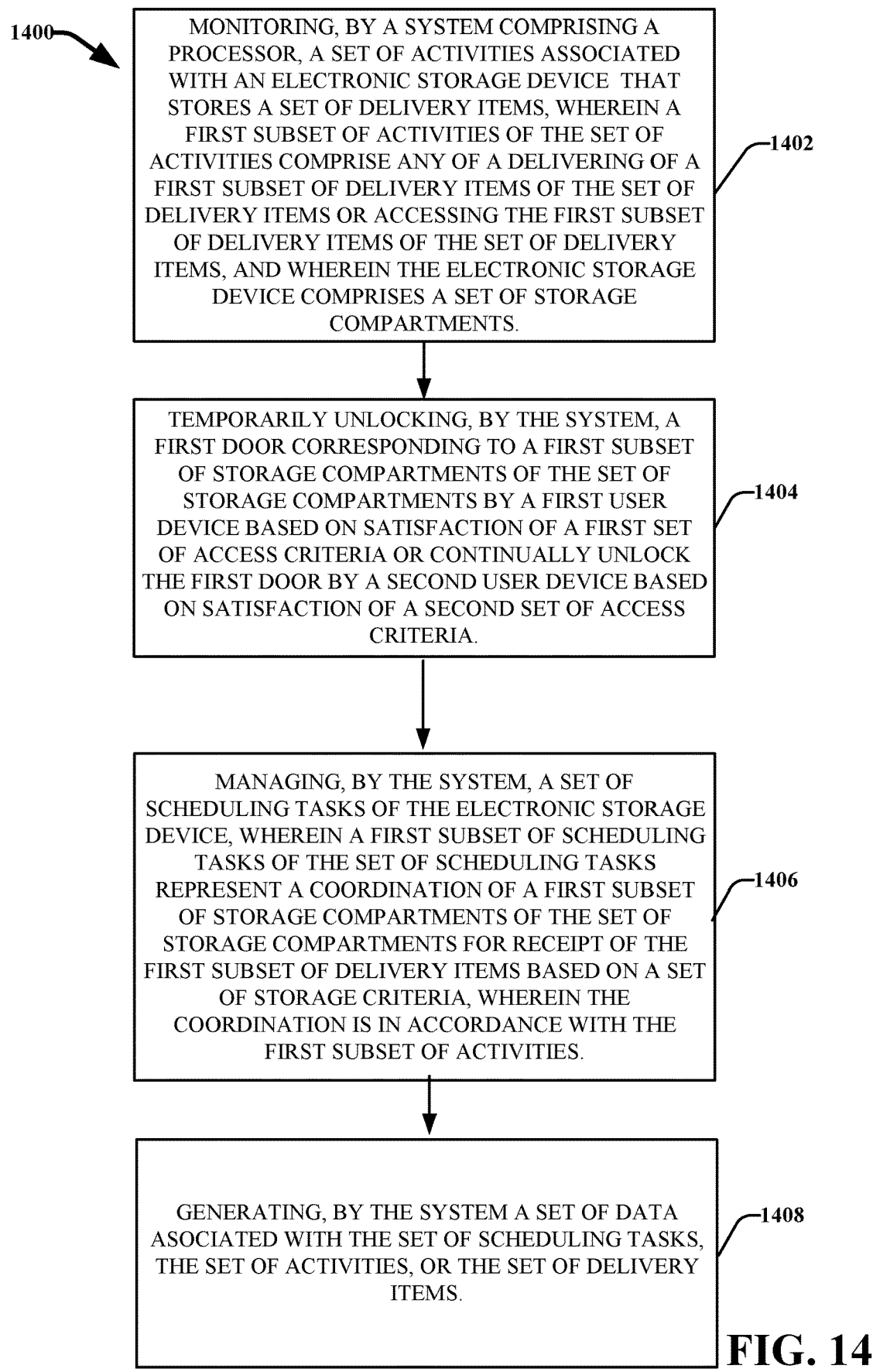
FIG. 14 illustrates a non-limiting example of a method 1400 for securely storing, delivering and retrieving items associated with a smart mailbox device.

Turning now to FIG. 14 provided is an example non-limiting method 1400 for operating a smart mailbox. Repetitive description of like elements employs in systems, devices, and methods disclosed herein are omitted for sake of brevity. For example, the method 1400 can provide for detecting embedded media items, links to media items, and the like, as well as selecting content associated with the resource that embeds and/or links to the media item. Repetitive description of like elements employed in system and methods disclosed herein is omitted for sake of brevity.

At 1402, a set of activities associated with a smart mailbox device are monitored (e.g., using monitoring component 610) by a system comprising a processor, wherein the device that stores a set of delivery items, wherein a first subset of activities of the set of activities comprise any of a delivering of a first subset of delivery items of the set of delivery items or accessing the first subset of delivery items of the set of delivery items, and wherein the smart mailbox comprises a set of storage compartments. At 1404, a first door corresponding to a first subset of storage compartments of the set of storage compartments is unlocked (e.g., using access component 130) using the system, by a first user device, based on satisfaction of a first set of access criteria or continually unlock the first door by a second user device based on satisfaction of a second set of access criteria.

At 1406, a set of scheduling tasks of the smart mailbox device are managed (e.g., using scheduling component 630), wherein a first subset of scheduling tasks of the set of scheduling tasks represent a coordination of a first subset of storage compartments of the set of storage compartments for receipt of the first subset of delivery items based on a set of storage criteria, wherein the coordination is in accordance with the first subset of activities. At 1408, a set of data associated with the set of scheduling tasks, the set of activities, or the set of delivery are generated (e.g., using generation component 710) by the system.

Figure 15:
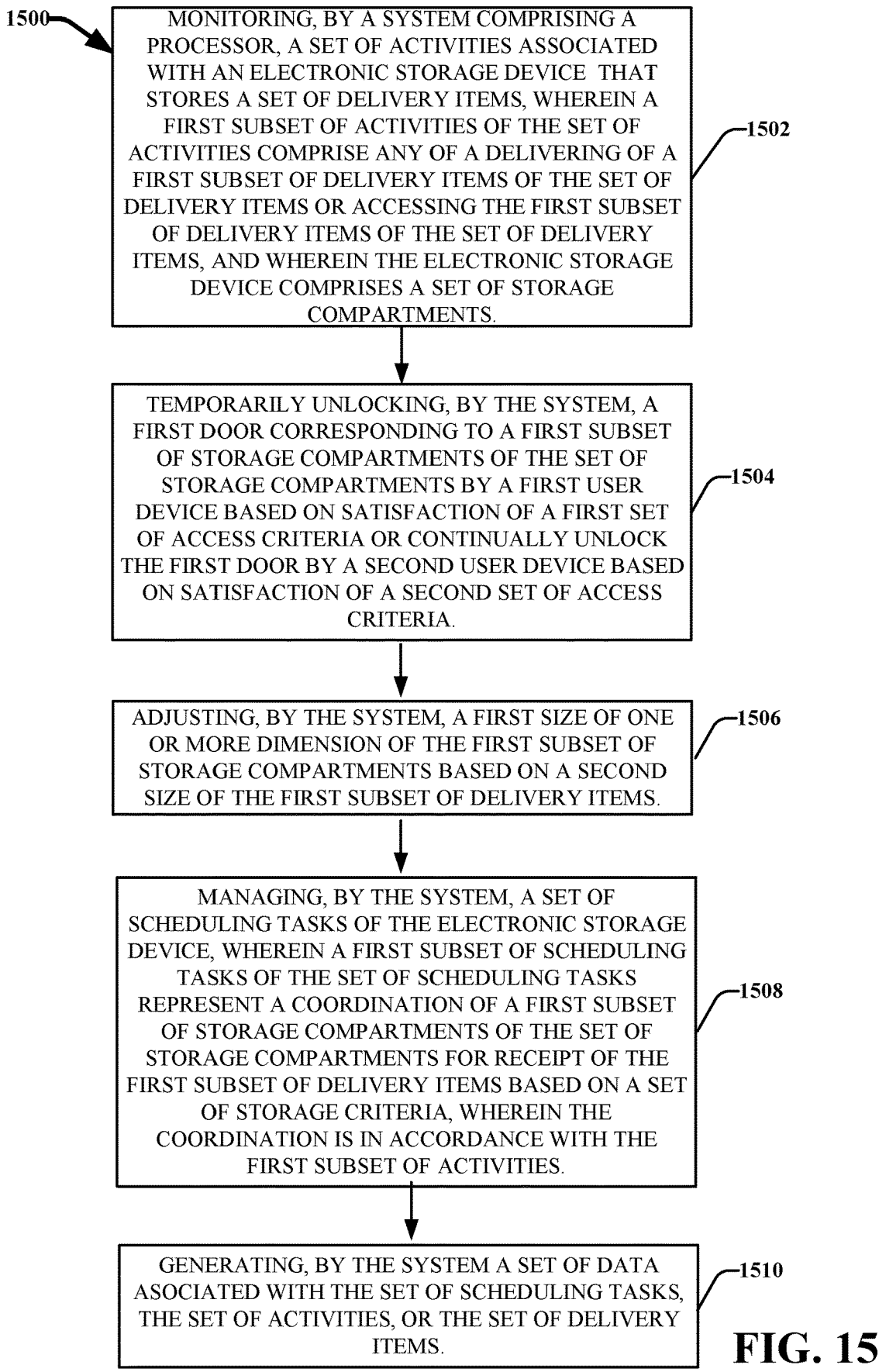
FIG. 15 illustrates a non-limiting example of a method 1500 for securely storing, delivering and retrieving items associated with a smart mailbox device.

Turning now to FIG. 15 provided is an example non-limiting method 1500 for operating a smart mailbox. Repetitive description of like elements employs in systems, devices, and methods disclosed herein are omitted for sake of brevity. For example, the method 1500 can provide for detecting embedded media items, links to media items, and the like, as well as selecting content associated with the resource that embeds and/or links to the media item. Repetitive description of like elements employed in system and methods disclosed herein is omitted for sake of brevity.

At 1502, a set of activities associated with a smart mailbox device are monitored (e.g., using monitoring component 610) by a system comprising a processor, wherein the device that stores a set of delivery items, wherein a first subset of activities of the set of activities comprise any of a delivering of a first subset of delivery items of the set of delivery items or accessing the first subset of delivery items of the set of delivery items, and wherein the smart mailbox comprises a set of storage compartments. At 1504, a first door corresponding to a first subset of storage compartments of the set of storage compartments is unlocked (e.g., using access component 130) using the system, by a first user device, based on satisfaction of a first set of access criteria or continually unlock the first door by a second user device based on satisfaction of a second set of access criteria. At 1506, a first size of one or more dimension of the first subset of storage compartments are adjusted (e.g., using sizing component 1010) by the system based on a second size of the first subset of delivery items.

At 1508, a set of scheduling tasks of the smart mailbox device are managed (e.g., using scheduling component 630), wherein a first subset of scheduling tasks of the set of scheduling tasks represent a coordination of a first subset of storage compartments of the set of storage compartments for receipt of the first subset of delivery items based on a set of storage criteria, wherein the coordination is in accordance with the first subset of activities. At 1510, a set of data associated with the set of scheduling tasks, the set of activities, or the set of delivery are generated (e.g., using generation component 710) by the system.

Figure 16:
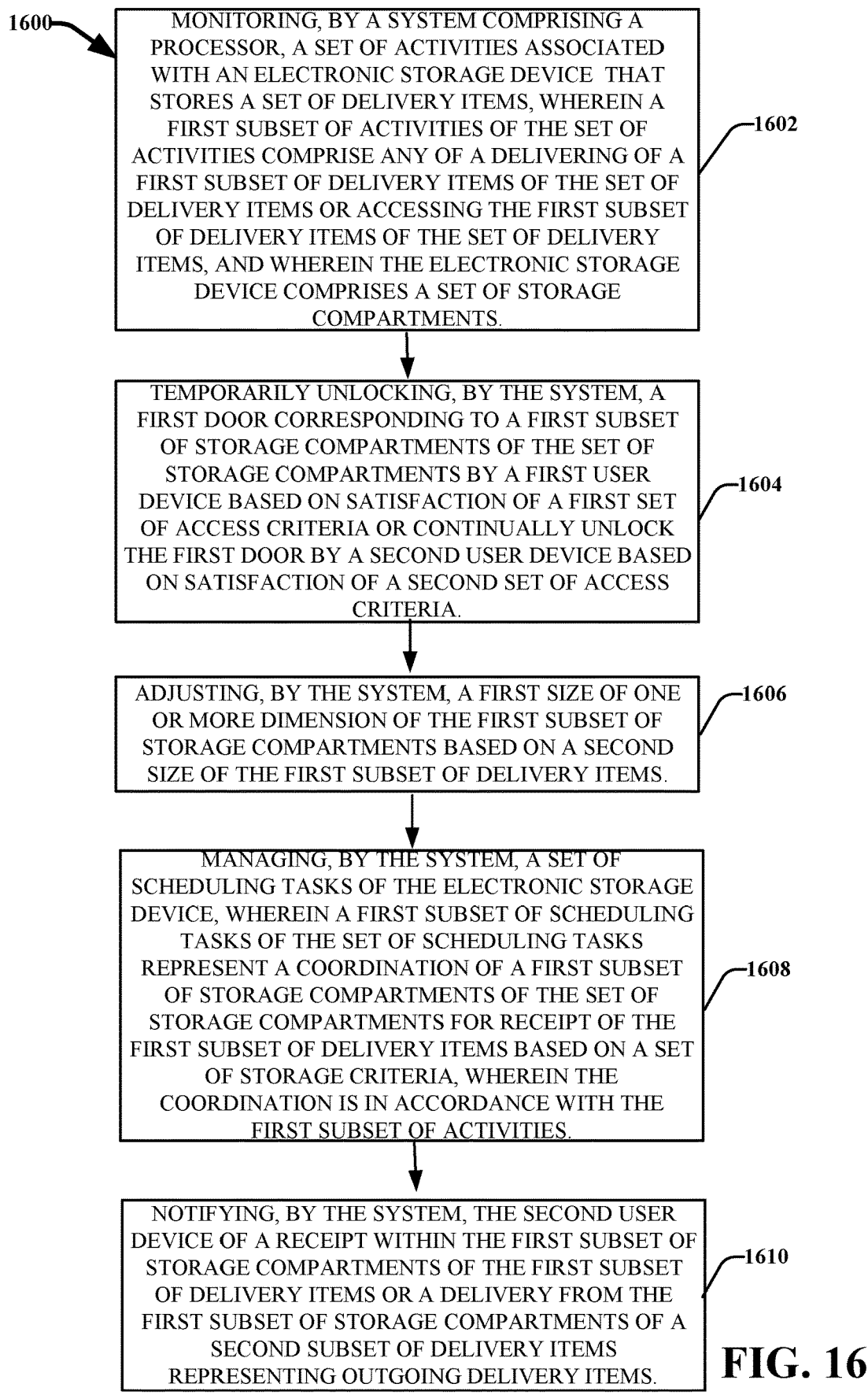
FIG. 16 illustrates a non-limiting example of a method 1600 for securely storing, delivering and retrieving items associated with a smart mailbox device.

Turning now to FIG. 16 provided is an example non-limiting method 1600 for operating a smart mailbox. Repetitive description of like elements employs in systems, devices, and methods disclosed herein are omitted for sake of brevity. For example, the method 1600 can provide for detecting embedded media items, links to media items, and the like, as well as selecting content associated with the resource that embeds and/or links to the media item. Repetitive description of like elements employed in system and methods disclosed herein is omitted for sake of brevity.

At 1602, a set of activities associated with a smart mailbox device are monitored (e.g., using monitoring component 610) by a system comprising a processor, wherein the device that stores a set of delivery items, wherein a first subset of activities of the set of activities comprise any of a delivering of a first subset of delivery items of the set of delivery items or accessing the first subset of delivery items of the set of delivery items, and wherein the smart mailbox comprises a set of storage compartments. At 1604, a first door corresponding to a first subset of storage compartments of the set of storage compartments is unlocked (e.g., using access component 130) using the system, by a first user device, based on satisfaction of a first set of access criteria or continually unlock the first door by a second user device based on satisfaction of a second set of access criteria. At 1606, a first size of one or more dimension of the first subset of storage compartments are adjusted (e.g., using sizing component 1010) by the system based on a second size of the first subset of delivery items.

At 1608, a set of scheduling tasks of the smart mailbox device are managed (e.g., using scheduling component 630), wherein a first subset of scheduling tasks of the set of scheduling tasks represent a coordination of a first subset of storage compartments of the set of storage compartments for receipt of the first subset of delivery items based on a set of storage criteria, wherein the coordination is in accordance with the first subset of activities. At 1610, the second user device is notified (e.g., using notification component 1210) by the system of a receipt within the first subset of storage compartments of the first subset of delivery items or a delivery from the first subset of storage compartments of a second subset of delivery items representing outgoing delivery items.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 17:
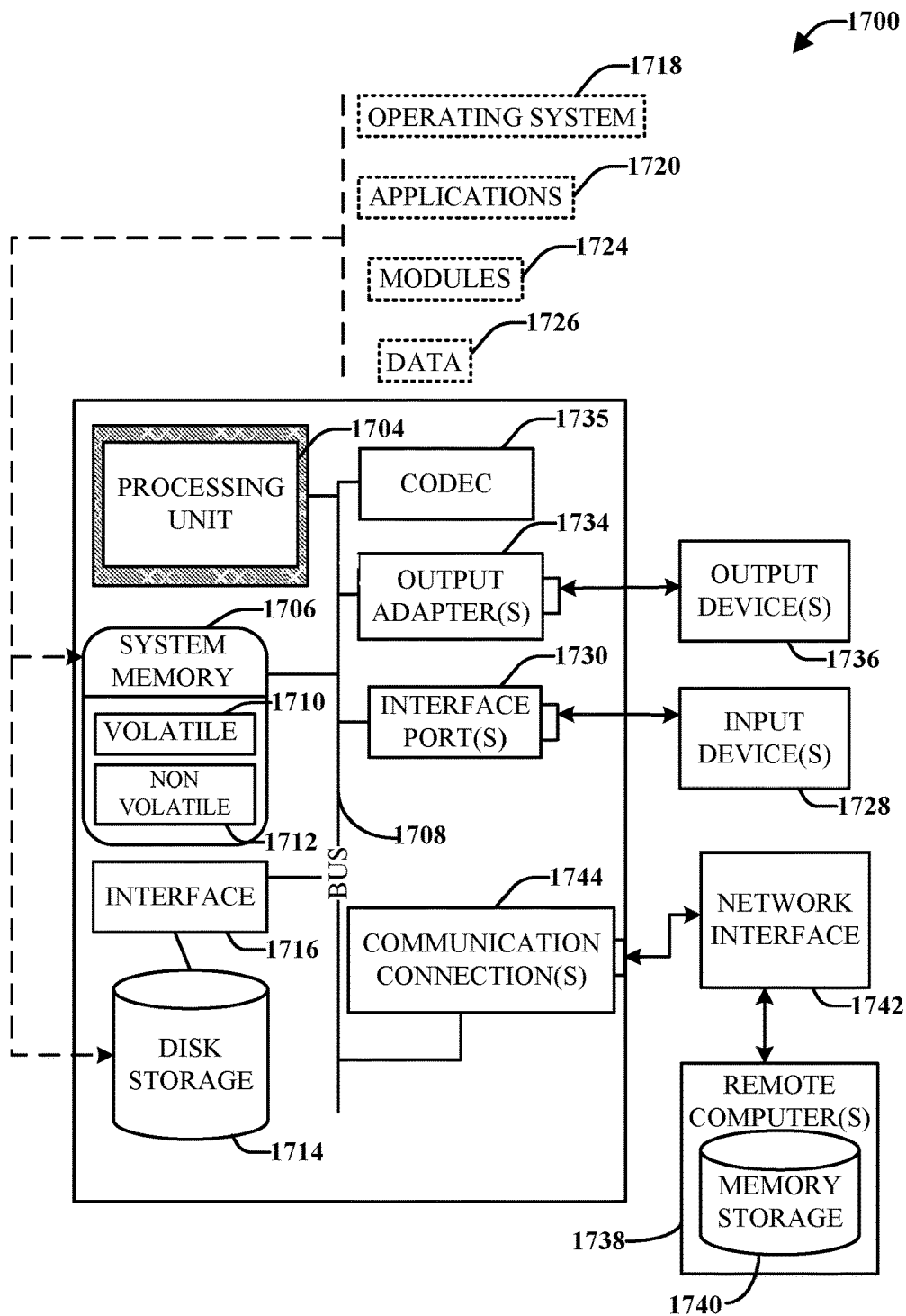
FIG. 17 is a schematic block diagram illustrating a suitable operating environment 1700 in accordance with various aspects and embodiments.

With reference to FIG. 17, a suitable environment 1700 for implementing various aspects of the claimed subject matter includes a computer 1702. The computer 1702 includes a processing unit 1704, a system memory 1706, a codec 1705, and a system bus 1708. The system bus 1708 couples system components including, but not limited to, the system memory 1706 to the processing unit 1704. The processing unit 1704 can be any of various available suitable processors. Dual microprocessors and other multiprocessor architectures also can be employed as the processing unit 1704.

The system bus 1708 can be any of several types of suitable bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 16104), and Small Computer Systems Interface (SCSI).

The system memory 1706 includes volatile memory 1710 and non-volatile memory 1712. The basic input/output system (BIOS), containing the basic routines to transfer information between elements within the computer 1702, such as during start-up, is stored in non-volatile memory 1712. In addition, according to present innovations, codec 1705 may include at least one of an encoder or decoder, wherein the at least one of an encoder or decoder may consist of hardware, a combination of hardware and software, or software. Although, codec 1705 is depicted as a separate component, codec 1705 may be contained within non-volatile memory 1712. By way of illustration, and not limitation, non-volatile memory 1712 can include read only memory (ROM), programmable ROM (PROM), electrically programmable ROM (EPROM), electrically erasable programmable ROM (EEPROM), or flash memory. Volatile memory 1710 includes random access memory (RAM), which acts as external cache memory. According to present aspects, the volatile memory may store the write operation retry logic (not shown in FIG. 17) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1702 may also include removable/non-removable, volatile/non-volatile computer storage medium. FIG. 17 illustrates, for example, disk storage 1714. Disk storage 1714 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1714 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1714 to the system bus 1708, a removable or non-removable interface is typically used, such as interface 1716.

It is to be appreciated that FIG. 17 describes software that acts as an intermediary between users and the basic computer resources described in the suitable operating environment 1700. Such software includes an operating system 1718. Operating system 1718, which can be stored on disk storage 1714, acts to control and allocate resources of the computer system 1702. Applications 1720 take advantage of the management of resources by operating system 1718 through program modules 1724, and program data 1726, such as the boot/shutdown transaction table and the like, stored either in system memory 1706 or on disk storage 1714. It is to be appreciated that the claimed subject matter can be implemented with various operating systems or combinations of operating systems.

A user enters commands or information into the computer 1702 through input device(s) 1728. Input devices 1728 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1704 through the system bus 1708 via interface port(s) 1730. Interface port(s) 1730 include, for example, a serial port, a parallel port, a game port, and a universal serial bus (USB). Output device(s) 1736 use some of the same type of ports as input device(s). Thus, for example, a USB port may be used to provide input to computer 1702, and to output information from computer 1702 to an output device 1736. Output adapter 1734 is provided to illustrate that there are some output devices 1736 like monitors, speakers, and printers, among other output devices 1736, which require special adapters. The output adapters 1734 include, by way of illustration and not limitation, video and sound cards that provide a means of connection between the output device 1736 and the system bus 1708. It should be noted that other devices and/or systems of devices provide both input and output capabilities such as remote computer(s) 1738.

Computer 1702 can operate in a networked environment using logical connections to one or more remote computers, such as remote computer(s) 1738. The remote computer(s) 1738 can be a personal computer, a server, a router, a network PC, a workstation, a microprocessor based appliance, a peer device, a smart phone, a tablet, or other network node, and typically includes many of the elements described relative to computer 1702. For purposes of brevity, only a memory storage device 1740 is illustrated with remote computer(s) 1738. Remote computer(s) 1738 is logically connected to computer 1702 through a network interface 1742 and then connected via communication connection(s) 1744. Network interface 1742 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1744 refers to the hardware/software employed to connect the network interface 1742 to the bus 1708. While communication connection 1744 is shown for illustrative clarity inside computer 1702, it can also be external to computer 1702. The hardware/software necessary for connection to the network interface 1742 includes, for exemplary purposes only, internal and external technologies such as, modems including regular telephone grade modems, cable modems and DSL modems, ISDN adapters, and wired and wireless Ethernet cards, hubs, and routers.

Figure 18:
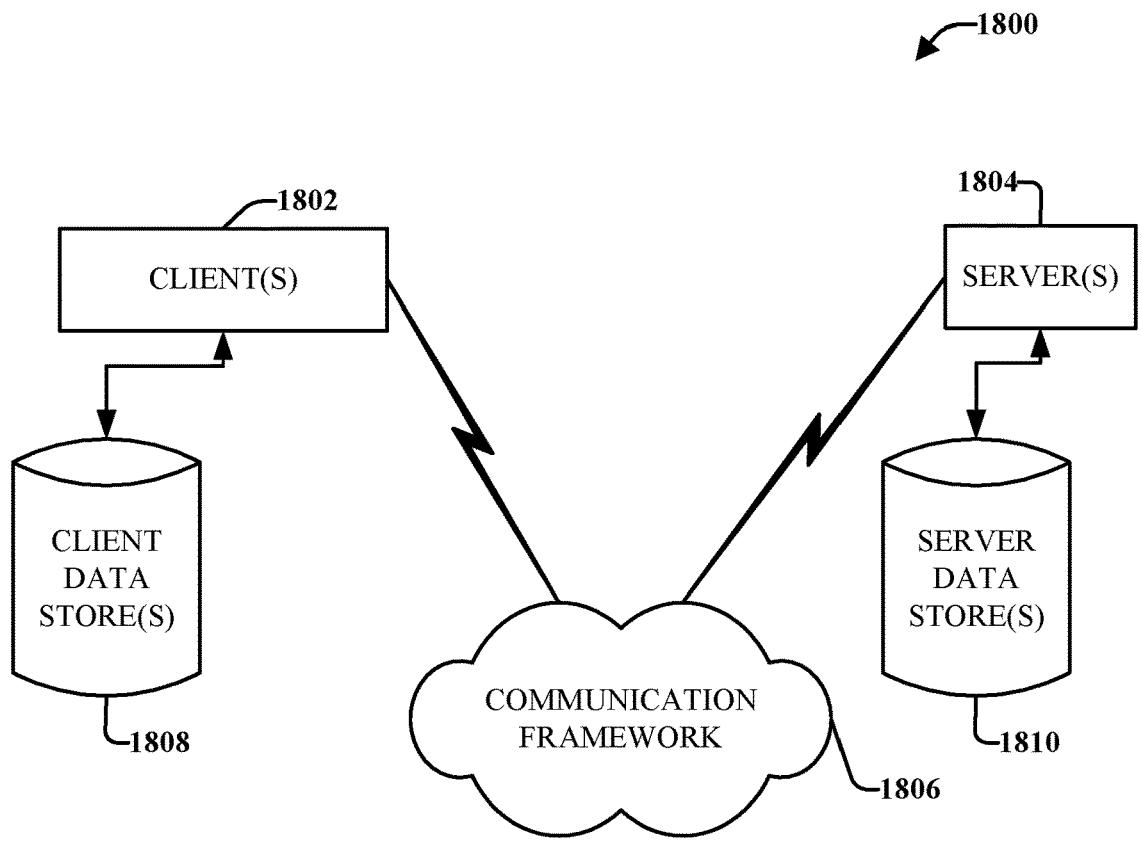
FIG. 18 is a schematic block diagram of a sample-computing environment 1800 in accordance with various aspects and embodiments.

Referring now to FIG. 18, there is illustrated a schematic block diagram of a computing environment 1800 in accordance with this disclosure. The system 1800 includes one or more client(s) 1802 (e.g., laptops, smart phones, PDAs, media players, computers, portable electronic devices, tablets, and the like). The client(s) 1802 can be hardware and/or software (e.g., threads, processes, computing devices). The system 1800 also includes one or more server(s) 1804. The server(s) 1804 can also be hardware or hardware in combination with software (e.g., threads, processes, computing devices). The servers 1804 can house threads to perform transformations by employing aspects of this disclosure, for example. One possible communication between a client 1802 and a server 1804 can be in the form of a data packet transmitted between two or more computer processes wherein the data packet may include video data. The data packet can include a metadata, e.g., associated contextual information, for example. The system 1800 includes a communication framework 1806 (e.g., a global communication network such as the Internet, or mobile network(s)) that can be employed to facilitate communications between the client(s) 1802 and the server(s) 1804.

Communications can be facilitated via a wired (including optical fiber) and/or wireless technology. The client(s) 1802 include or are operatively connected to one or more client data store(s) 1808 that can be employed to store information local to the client(s) 1802 (e.g., associated contextual information). Similarly, the server(s) 1804 are operatively include or are operatively connected to one or more server data store(s) 1810 that can be employed to store information local to the servers 1804.

In one embodiment, a client 1802 can transfer an encoded file, in accordance with the disclosed subject matter, to server 1804. Server 1804 can store the file, decode the file, or transmit the file to another client 1802. It is to be appreciated, that a client 1802 can also transfer uncompressed file to a server 1804 and server 1804 can compress the file in accordance with the disclosed subject matter. Likewise, server 1804 can encode video information and transmit the information via communication framework 1806 to one or more clients 1802.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from a computer-readable device or storage media.

What is claimed is:

1. A method, comprising:
receiving, by a processor of a server device, from a courier device, a notification that a parcel of a set of parcels comprises a controlled substance;
notifying, by the processor of the server device, a smart locker device that the parcel comprises the controlled substance associated with storage requirements and restrictive access requirements, wherein the smart locker device comprises a set of storage compartments configured to store the set of parcels, and wherein a set of doors are connected to the set of storage compartments;
automatically controlling, by a thermostat of the smart locker device, a temperature within a receptacle portion of a first compartment of the set of storage compartments of the smart locker device, wherein the first compartment is scheduled to store the parcel, and wherein the automatic controlling is based on the smart locker device:
  detecting, by a heat sensor of the smart locker device, a first temperature within the receptacle portion of the first compartment;
  determining, by another processor coupled to the smart locker device, a required temperature adjustment based on an estimated receipt time and a comparison of the first temperature and a target temperature of the first receptacle portion based on the storage requirements;
  automatically adjusting, by the thermostat of the smart locker device, the temperature of the receptacle portion based on the required temperature adjustment, the storage requirements, and a determined proximity of a delivery vehicle transporting the parcel to the smart locker device based on geo-fence location sensing;
automatically operating an unlocking mechanism of the first compartment of the smart locker device based on satisfaction of enhanced and reconfigured first compartment access requirements comprising:
  receiving, by the smart locker device, authorization data of a user requesting access to the first compartment in accordance with a first security mechanism, wherein the authorization data represents an access code comprising at least one of a driver license number or social security number of an authorized user;

determining, by the processor of the server device, whether the intake authorization data is valid based on a comparison of the intake authorization data to valid authorization data and valid age data;

grant access to a second security mechanism for one or more predefined period of time based on determining the intake authorization data is valid authorization data;

triggering a capture of image data, by a camera portion of the smart locker device corresponding to the user requesting access to the first compartment;

determining, by the processor of the server device, whether the user image data corresponds to a valid authorized user based on a comparison of the user image data to a valid authorized user image stored at a database of the server device;

granting, by the processor of the server device, access to a third security mechanism based on determining the user image data is valid user image data;

triggering, by the smart locker device, a capture of access input data from a group consisting of biometric validation data and optical recognition validation data;

determining, by the processor of the server device, whether the biometric validation data or the optical recognition validation data corresponds to a valid authorized user based on a comparison of the user image data to valid authorized biometric validation data and valid authorized optical recognition data stored at database of the server device;

notifying, by the processor of the server device, the smart locker device of an authorization of the authorization data, the user image data, and the optical recognition validation data;

based on the authorization of the user image data, the smart locker device automatically unlocks a locking mechanism of a first door of the first compartment for the one or more predefined period of time to unlock the first door;

analyzing, by the processor of the server device, device data from at least one component of the smart locker device, wherein the device data represents data associated with a set of locking events associated with a locking or unlocking of the first door, a set of access events associated with grants or denials of access to the set of storage compartments, or a set of characteristics associated with receipt of the set of parcels stored within the set of storage compartments;

generating, by the processor of the server device, predictive data based on an analysis of the smart locker device data, wherein the predictive data represents a set of operations for performance by the at least one component comprising at least one of the locking mechanism, an access component, or the first compartment of the smart locker device; and triggering, by the processor of the server device, an adjustment to a planned operation of the at least one component of the smart locker device based on the predictive data, wherein the adjustment to the planned operation comprises at least executing the additional restrictive access requirements based on the set of parcels being determined to be a set of controlled substance.

2. The method of claim 1, further comprising determining, by the processor of the server device, a schedule for performing the planned operation based on at least one of an operation type, occupancy requirements or vacancy requirements of the set of storage compartments, storage requirements of the set of parcel items, scheduled tasks for other smart locker devices within a predefined proximity of the smart locker device.

3. The method of claim 1, further comprising adjusting, by the smart locker device, the thermostat of the smart locker device to adjust a temperature setting within at least one storage compartment of the set of storage compartments based on the predictive data corresponding to at least one parcel item of the set of parcel items.

4. The method of claim 1, wherein the set of storage compartments are connected to the set of doors via hinges, wherein the set of storage compartments are accessible by the set of doors, wherein the set of storage compartments comprise floor portions, ceiling portions, and wall portions connecting the floor portions to the ceiling portion, and wherein the set of compartments and the set of doors are interconnected via locking mechanisms configured to unlock the set of doors.

5. The method of claim 1, further comprising receiving, by a drone drop compartment of the set of compartments, a drone device, wherein the drone device enters the drone drop compartment through a retractable roof portion of the drone drop compartment based on an authentication signal emitted by the drone device.

6. The method of claim 1, further comprising detecting, by a detection sensor of the smart locker device, a presence or absence of a drone device.

7. The method of claim 1, further comprising detecting, by the smart locker device, a proximity of a user device to the smart locker device based on a geo-fencing mechanism employed by the smart locker device or at least one proximity sensor employed by the smart locker device.

8. The method of claim 1, further comprising generating, by the smart locker device, device data from the set of storage compartments, wherein the device data represents at least one of the set of locking events associated with a locking or unlocking of the locking mechanism, the set of access events associated with grants or denials of access to the set of storage compartments, or the set of characteristics associated with the set of parcel.

9. The method of claim 1, further comprising adjusting, by the smart locker device, a set of dimensions corresponding to at least one storage compartment of the set of storage compartments based on a detected measurement of at least one parcel of the set of parcels.

10. The method of claim 1, further comprising measuring a set of dimensions of at least on storage compartment of the set of storage compartments based on a series of measurements between optical beams within the at least one storage compartment and a set of surfaces corresponding to the parcel.

11. A system, comprising:
a memory that stores executable instructions; and
at least one processor, communicatively coupled to the memory, that facilitates execution of the executable instructions to perform operations, comprising:
receiving, by a server device communicatively coupled to the at least one processor, from a courier device, a notification that a parcel of a set of parcels comprises a controlled substance;
notifying, by the server device, a smart locker device, communicatively coupled to the at least one processor, that the parcel comprises the controlled substance associated with storage requirements and restrictive access requirements, wherein the smart locker device comprises a set of storage compartments configured to store the set of parcels, and wherein a set of doors are connected to the set of storage compartments;

automatically controlling, by a thermostat of the smart locker device, a temperature within a receptacle portion of a first compartment of the set of storage compartments of the smart locker device, wherein the first compartment is scheduled to store the parcel, and wherein the automatic controlling is based on the smart locker device:

detecting, by a heat sensor of the smart locker device, a first temperature within the receptacle portion of the first compartment;

determining, by the smart locker device, a required temperature adjustment based on the estimated receipt time and a comparison of the first temperature and a target temperature of the receptacle portion based on the storage requirements;

automatically adjusting, by the thermostat of the smart locker device, the temperature of the receptacle portion based on the required temperature adjustment, the storage requirements, and a determined proximity of a delivery vehicle transporting the parcel to the smart locker device based on geo-fence location sensing;

automatically operating an unlocking mechanism of the first compartment of the smart locker device based on satisfaction of enhanced and reconfigured first compartment access requirements comprising:

receiving, by the smart locker device, authorization data of a user requesting access to the first compartment in accordance with a first security mechanism, wherein the authorization data represents an access code comprising at least one of a driver license number or social security number of an authorized user;

determining, by the server device, whether the intake authorization data is valid based on a comparison of the intake authorization data to valid authorization data and valid age data;

grant access to a second security mechanism for one or more predefined period of time based on determining the intake authorization data is valid authorization data;

triggering a capture of image data, by a camera portion of the smart locker device corresponding to the user requesting access to the first compartment;

determining, by the server device, whether the user image data corresponds to a valid authorized user based on a comparison of the user image data to a valid authorized user image stored at a database of the server device;

granting, by the server device, access to a third security mechanism based on determining the user image data is valid user image data;

triggering, by the smart locker device, a capture of access input data from a group consisting of biometric validation data and optical recognition validation data;

determining, by the server device, whether the biometric validation data or the optical recognition validation data corresponds to a valid authorized user based on a comparison of the user image data to valid authorized biometric validation data and valid authorized optical recognition data stored at the database of the server device;

notifying, by the server device, the smart locker device of an authorization of the authorization data, the user image data, and the optical recognition validation data;

based on the authorization of the user image data, the smart locker device automatically unlocks a locking mechanism of a first door of the first compartment for the one or more predefined period of time to unlock the first door;

analyzing, by the server device, device data from at least one component of the smart locker device, wherein the device data represents data associated with a set of locking events associated with a locking or unlocking of the first door, a set of access events associated with grants or denials of access to the set of storage compartments, or a set of characteristics associated with receipt of the set of parcels items stored within the set of storage compartments;

generating, by the server device, predictive data based on an analysis of the smart locker device data, wherein the predictive data represents a set of operations for performance by the at least one component comprising at least one of the locking mechanism, an access component, or the first compartment of the smart locker device; and triggering, by the server device, an adjustment to a planned operation of the at least one component of the smart locker device based on the predictive data, wherein the adjustment to the planned operation comprises at least executing the additional restrictive access requirements based on the set of parcels being determined to be a set of controlled substance.

12. The system of claim 11, further comprising determining, by the server device, a schedule for performing the planned operation based on at least one of an operation type, occupancy requirements or vacancy requirements of the set of storage compartments, storage requirements of the set of parcel items, scheduled tasks for other smart locker devices within a predefined proximity of the smart locker device.

13. The system of claim 11, further comprising adjusting, by the smart locker device, the thermostat of the smart locker device to adjust a temperature setting within at least one storage compartment of the set of storage compartments based on the predictive data corresponding to at least one parcel item of the set of parcel items.

14. The system of claim 11, wherein the set of storage compartments are connected to the set of doors via hinges, wherein the set of storage compartments are accessible by the set of doors, wherein the set of storage compartments comprise floor portions, ceiling portions, and wall portions connecting the floor portions to the ceiling portion, and wherein the set of compartments and the set of doors are interconnected via locking mechanisms configured to unlock the set of doors.

15. The system of claim 11, further comprising receiving, by a drone drop compartment of the set of compartments, a drone device, wherein the drone device enters the drone drop compartment through a retractable roof portion of the drone drop compartment based on an authentication signal emitted by the drone device.

16. The system of claim 11, further comprising detecting, by a detection sensor of the smart locker device, a presence or absence of a drone device.

17. The system of claim 11, further comprising detecting, by the smart locker device, a proximity of a user device to the smart locker device based on a geo-fencing mechanism employed by the smart locker device or at least one proximity sensor employed by the smart locker device.

18. The system of claim 11, further comprising generating, by the smart locker device, device data from the set of storage compartments, wherein the device data represents at least one of the set of locking events associated with a locking or unlocking of the locking mechanism, the set of access events associated with grants or denials of access to the set of storage compartments, or the set of characteristics associated with the set of parcel.

19. The system of claim 11, further comprising adjusting, by the smart locker device, a set of dimensions corresponding to at least one storage compartment of the set of storage compartments based on a detected measurement of at least one parcel of the set of parcels.

20. The system of claim 11, further comprising measuring a set of dimensions of at least on storage compartment of the set of storage compartments based on a series of measurements between optical beams within the at least one storage compartment and a set of surfaces corresponding to the parcel.

\* \* \* \* \*